(12) United States Patent
Shiota et al.

(10) Patent No.: US 10,935,414 B2
(45) Date of Patent: Mar. 2, 2021

(54) LIQUID LEVEL INDICATING DEVICE AND LIQUID-COOLED ELECTRIC APPLIANCE

(71) Applicant: TOSHIBA INDUSTRIAL PRODUCTS AND SYSTEMS CORP, Kawasaki (JP)

(72) Inventors: Hiromu Shiota, Mie (JP); Shota Ikeda, Mie (JP); Midori Yamashita, Mie (JP); Yosuke Takai, Mie (JP); Kazuaki Ito, Mie (JP)

(73) Assignee: TOSHIBA INDUSTRIAL PRODUCTS AND SYSTEMS CORP, Kawasaki (JP)

( * ) Notice: Subject to any disclaimer, the term of this patent is extended or adjusted under 35 U.S.C. 154(b) by 231 days.

(21) Appl. No.: 16/230,796

(22) Filed: Dec. 21, 2018

(65) Prior Publication Data

US 2019/0120683 A1    Apr. 25, 2019

Related U.S. Application Data

(63) Continuation of application No. PCT/JP2017/019017, filed on May 22, 2017.

(30) Foreign Application Priority Data

Jul. 8, 2016 (JP) .................. 2016-135982
Dec. 28, 2016 (JP) .................. 2016-255676

(51) Int. Cl.
*G01F 23/42* (2006.01)
*H01F 27/14* (2006.01)
*H01F 27/12* (2006.01)

(52) U.S. Cl.
CPC ............. *G01F 23/42* (2013.01); *H01F 27/12* (2013.01); *H01F 27/14* (2013.01)

(58) Field of Classification Search
None
See application file for complete search history.

(56) References Cited

U.S. PATENT DOCUMENTS 7,841,235 B2 *  11/2010  Haberstroh ........... G01F 23/246
                                                         73/295
2003/0094044 A1   5/2003  Kruger et al.

FOREIGN PATENT DOCUMENTS

CN     2200815     6/1995
CN     1641322     7/2005
(Continued)

OTHER PUBLICATIONS

International Search Report in PCT/JP2017/019017 dated Jul. 11, 2017.

(Continued)

*Primary Examiner* — Lisa M Caputo
*Assistant Examiner* — Nigel H Plumb
(74) *Attorney, Agent, or Firm* — DLA Piper LLP US

(57) ABSTRACT

A liquid level indicating device includes a moving member which is arranged in a liquid tank storing a cooling liquid and moves vertically in conjunction with variation in a liquid level of the cooling liquid, a string member having one end portion connected to the moving member, the string member being configured to be bendable and non-extendable in a longitudinal direction, an indicator connected to the other end portion of the string member and which indicates a height position of the moving member as a remaining amount of the cooling liquid by operating in conjunction with movement of the moving member through the string member, and a tube member which is configured to be bendable and non-extendable in the longitudinal direction, has the string member passed therethrough, and connects the liquid tank and the indicator.

16 Claims, 22 Drawing Sheets

(56) References Cited

FOREIGN PATENT DOCUMENTS

| | | |
|---|---|---|
| CN | 105244143 | 1/2016 |
| JP | S48-053376 | 7/1973 |
| JP | S52-035266 | 3/1977 |
| JP | S53-035875 | 3/1978 |
| JP | S61-008829 | 1/1986 |
| JP | H06-061069 | 3/1994 |
| JP | H08-015327 | 1/1996 |
| JP | 2002-357469 | 12/2002 |
| JP | 2017146151 A * | 8/2017 |

OTHER PUBLICATIONS

Chinese Office Action in CN Application No. 2017800358780 dated Nov. 14, 2019.

\* cited by examiner

LIQUID LEVEL INDICATING DEVICE AND LIQUID-COOLED ELECTRIC APPLIANCE

CROSS-REFERENCE TO RELATED APPLICATIONS

This application is a continuation to an International Application No. PCT/JP2017/019017, filed on May 22, 2017 which is based upon and claims the benefit of priority from Japanese Patent Application No. 2016-135982, filed on Jul. 8, 2016 and Japanese Patent Application No. 2016-255676, filed on Dec. 28, 2016, the entire contents of which are incorporated herein by reference.

TECHNICAL FIELD

The present invention relates to a liquid level indicating device and a liquid-cooled electric appliance.

BACKGROUND ART

A liquid-cooled electric appliance such as a transformer and a reactor, for example, is cooled by being immersed in a cooling liquid such as insulating oil and liquid silicone. Such a liquid-cooled electric appliance needs to be configured such that a remaining amount of the cooling liquid in a liquid tank can be checked during maintenance from an outside of the liquid tank storing the cooling liquid and also accommodating the electric appliance. Thus, conventionally, an inspection window, for example, has been provided in the liquid tank, and the remaining amount of the cooling liquid has been checked by visually recognizing the liquid level in the liquid tank directly.

However, in order to visually recognize variation in the liquid level, the inspection window needs to be provided close to the liquid level. Thus, a mounting position of the inspection window is limited to the vicinity of the liquid level of the cooling liquid, but if the liquid-cooled electric appliance has a large size, it is provided at a high position from an installation surface, and there is a problem that visibility by a worker is lowered.

Moreover, such configuration is considered that, in order to check the remaining amount of the cooling liquid in a conservator, for example, one end portion of a line gauge configured to have a string shape is provided on an inner side of an air bag of the conservator so that it is movable vertically with the variation in the liquid level in the liquid tank. In this case, since the other end portion of the line gauge is withdrawn to the outside from the liquid tank, the worker can check the height position of the liquid level, that is, the remaining amount of cooling liquid by extending the other end portion of the string member and by looking at a length of the string member when it is extended. According to this, the worker can check the remaining amount of the cooling liquid even at a position far away from the liquid level (Patent Literature 1, for example).

However, in those with the aforementioned configuration, each time the worker is to check the remaining amount of the cooling liquid, the worker needs to remove a box containing the line gauge and to extend the line gauge, and the work is cumbersome. Moreover, the line gauge with the aforementioned configuration is passed through a metal pipe having rigidity. In this case, since a withdrawing position of the other end portion of the line gauge is limited depending on a shape or arrangement of the pipe, there is a problem that the worker cannot easily change the withdrawing position of the line gauge from the pipe, that is, the check position.

CITATION LIST

Patent Literature

Patent Literature 1: Japanese Patent Laid-Open No. 06-061069

SUMMARY OF INVENTION

Technical Problem

Moreover, there is a demand that a liquid level indicating device indicating a change amount of the liquid level should also be configured to be small.

Embodiments are made in view of the aforementioned problems and provide a liquid level indicating device and a liquid-cooled electric appliance including the liquid level indicating device in which a degree of freedom in a mounting position of an indicator is improved and which can facilitate check of the remaining amount of a cooling liquid. Moreover, a small-sized liquid level indicating device and a liquid-cooled electric appliance including the liquid level indicating device are provided.

Solution to Problems

A liquid level indicating device of the embodiments includes a moving member which is arranged in a liquid tank storing a cooling liquid and moves vertically in conjunction with variation in a liquid level of the cooling liquid, a string member having one end portion connected to the moving member, the string member being configured to be bendable and non-extendable in a longitudinal direction, an indicator which is connected to the other end portion of the string member and indicates a height position of the moving member as a remaining amount of the cooling liquid by operating in conjunction with movement of the moving member through the string member, and a tube member configured to be bendable and non-extendable in the longitudinal direction, the tube member connecting the liquid tank and the indicator to each other with the string member passed therethrough.

DESCRIPTION OF EMBODIMENTS

Figure 1:
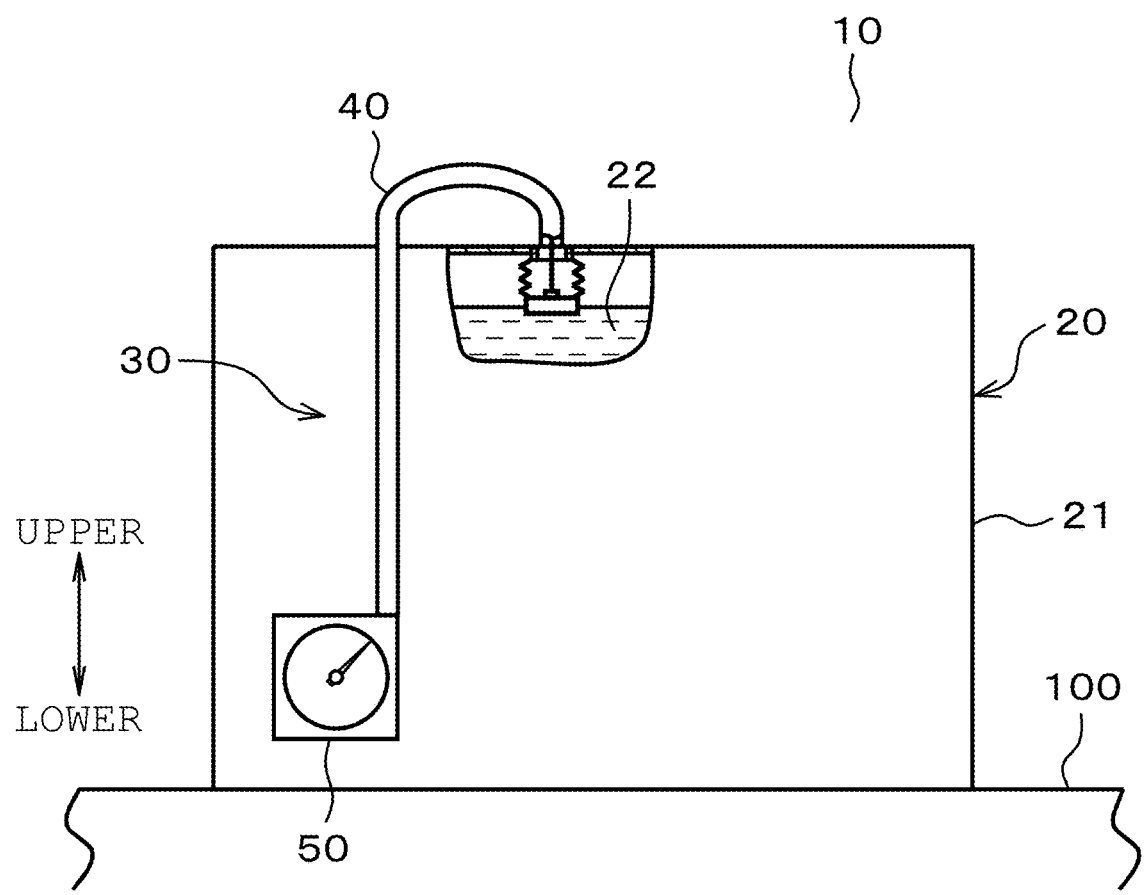
FIG. 1 is a view illustrating a schematic constitution of a liquid-cooled electric appliance according to a first embodiment.

A plurality of embodiments will be described below by referring to the attached drawings. In each of the embodiments, substantially the same elements are given the same reference numerals, and the description will be omitted.

First Embodiment

First, a first embodiment will be described by referring to FIGS. 1 to 5.

A liquid-cooled electric appliance 10 illustrated in FIG. 1 includes an electric appliance body 20 and a liquid level indicating device 30. In the following description, a perpendicular direction to an installation surface 100 of the liquid-cooled electric appliance 10 is assumed to be a vertical direction of the liquid-cooled electric appliance 10.

Figure 2:
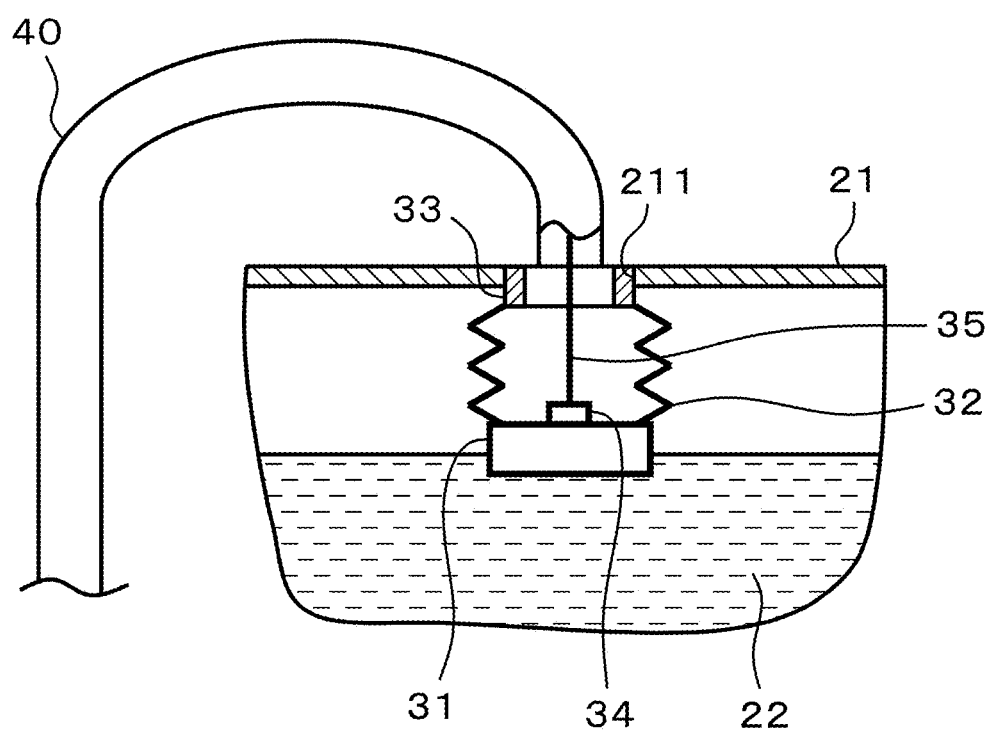
FIG. 2 is a view schematically illustrating constituent elements of a liquid level indicating device arranged in a housing in the liquid-cooled electric appliance according to the first embodiment.

The electric appliance body 20 has a housing 21 as an outer shell. The housing 21 accommodates electric appliances such as a transformer and a reactor, not shown, therein. Moreover, inside the housing 21, a cooling liquid 22 such as insulating oil and liquid silicone is stored. The electric appliance, not shown, accommodated in the housing 21 is immersed in the cooling liquid 22. As a result, the electric appliance, not shown, accommodated in the housing 21 is cooled by the cooling liquid 22. In this case, the housing 21 functions as a liquid tank which accommodates the electric appliance and stores the cooling liquid 22. Moreover, the housing 21 has a communication portion 211 as illustrated in FIG. 2. The communication portion 211 is formed by penetrating an upper surface of the housing 21 in a circular shape, for example, and causes an inside and an outside of the housing 21 to communicate with each other.

The liquid level indicating device 30 is provided on the housing 21 of the electric appliance body 20 as illustrated in FIG. 1 and indicates a height position of a liquid level of the cooling liquid 22 in the housing 21, that is, a remaining amount. Specifically, the liquid level indicating device 30 has a tube member 40 and an indicator 50. The indicator 50 is detachably mounted on an arbitrary surface of the housing 21 and at a position which can be seen easily by a worker.

The tube member 40 connects the housing 21 which is the liquid tank and the indicator 50. In the case of this embodiment, the tube member 40 is a hollow tube constituted by a bellows member made of metal or a resin and is configured to be relatively flexible and bendable and non-extendable in a longitudinal direction. The tube member 40 is flexibly bent following a change in a mounting position of the indicator 50. Thus, a user can arbitrarily change the mounting position of the indicator 50 without being much limited by the arrangement of the tube member 40.

The liquid level indicating device 30 has a float 31, an extension and contraction portion 32, a fixing member 33, a moving member 34, and a string member 35 as also illustrated in FIG. 2. The float 31 is configured to have a hollow shape, for example, and is configured so as to float on the cooling liquid 22. The float 31 is arranged by being floated on the liquid level of the cooling liquid 22 in the housing 21. The extension and contraction portion 32 is configured to have a cylindrical shape by a member having a bellows or a rubber member, for example, and is configured to be capable of extension and contraction in the vertical direction. In the case of this embodiment, the extension and contraction portion 32 is formed cylindrically, but this is not limiting. A lower end portion of the extension and contraction portion 32 is connected to the float 31, and an upper end portion of the extension and contraction portion 32 is connected to the fixing member 33.

The fixing member 33 is configured annularly, for example, and is inserted into an inner side of the communication portion 211. An outer side portion of the fixing member 33 and an inner side portion of the communication portion 211 are in close contact with each other in a state having air tightness and water tightness. The moving member 34 is provided inside the housing 21 and on the inner side of the cylindrical shape of the extension and contraction portion 32 and is connected to the float 31. The moving member 34 is fixed to an upper surface of the float 31. In this case, the moving member 34 is for fixing one of end portions of the string member 35 to the float 31 and may be an adhesive tape or an adhesive, for example. Moreover, the moving member 34 and the float 31 may be formed integrally.

The string member 35 is configured flexibly by a wire made of metal, for example, to be bendable and non-extendable in the longitudinal direction. The string member 35 is passed through the communication portion 211 from the outside of the housing 21 and is led into the housing 21 and to the inner side of the extension and contraction portion 32. One end portion of the string member 35 is connected to the moving member 34, and the other end portion of the string member 35 is passed through the tube member 40 and is pulled into the indicator 50 illustrated in FIG. 1.

Figure 3:
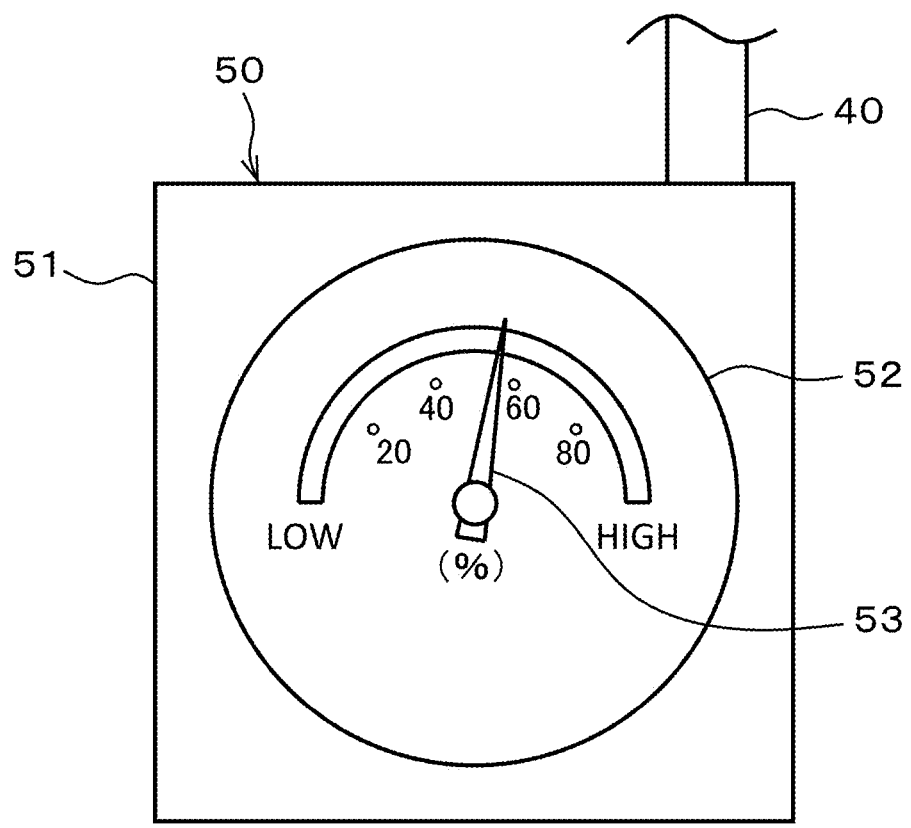
FIG. 3 is a view schematically illustrating an appearance constitution of an indicator of the liquid level indicating device for the liquid-cooled electric appliance according to the first embodiment.

The indicator 50 is connected to the other end portion of the string member 35 and indicates the height position of the moving member 34 as a liquid level position of the cooling liquid 22, that is, a remaining amount. The indicator 50 indicates the height position of the moving member 34 as the remaining amount of the cooling liquid 22 by operating in conjunction with the movement of the moving member 34 through the string member 35. The indicator 50 has a case 51, an indicating portion 52, and an indicating pointer 53 as illustrated in FIG. 3. The case 51 is formed having a box shape generally having air tightness and water tightness and constitutes an outer shell of the indicator 50. The other end portion of the tube member 40 is connected to the case 51. In this case, an inside of the case 51, the inside of the tube member 40, and the inside of the extension and contraction portion 32 communicate with each other and are configured in a sealed space, that is, a space having air tightness and water tightness.

The indicating portion 52 and the indicating pointer 53 are accommodated in the case 51. In this case, a surface of the case 51 on the worker side is constituted by a transparent member, for example, and as a result, at least the indicating portion 52 and the indicating pointer 53 can be visually recognized from the outside of the case 51.

The indicating portion 52 is for indicating the liquid level position of the cooling liquid 22 in the housing 21, that is, the remaining amount. In the case of this embodiment, the indicating portion 52 is for indicating the current liquid level of the cooling liquid 22 present in the housing 21 as a ratio to a maximum liquid level which can be stored in the housing 21. In this case, the term "LOW" described on the indicating portion 52 means that the remaining amount of the cooling liquid 22 is small, that is, the liquid level position is low, and the term "HIGH" means that the remaining amount of the cooling liquid 22 is large, that is, the liquid level position is high. Moreover, numerals "20", "40", "60", and "80" in the indicating portion 52 indicate a ratio when the maximum liquid level is assumed to be 100%.

The indicating pointer 53 is provided rotatably so that a distal end portion follows the indication of the indicating portion 52 and indicates the current liquid level position of the cooling liquid 22, that is, the remaining amount. Therefore, clockwise rotation of the indicating pointer 53 means that the cooling liquid 22 has increased, while the counter-clockwise rotation of the indicating pointer 53 means that the cooling liquid 22 has decreased.

Figure 4:
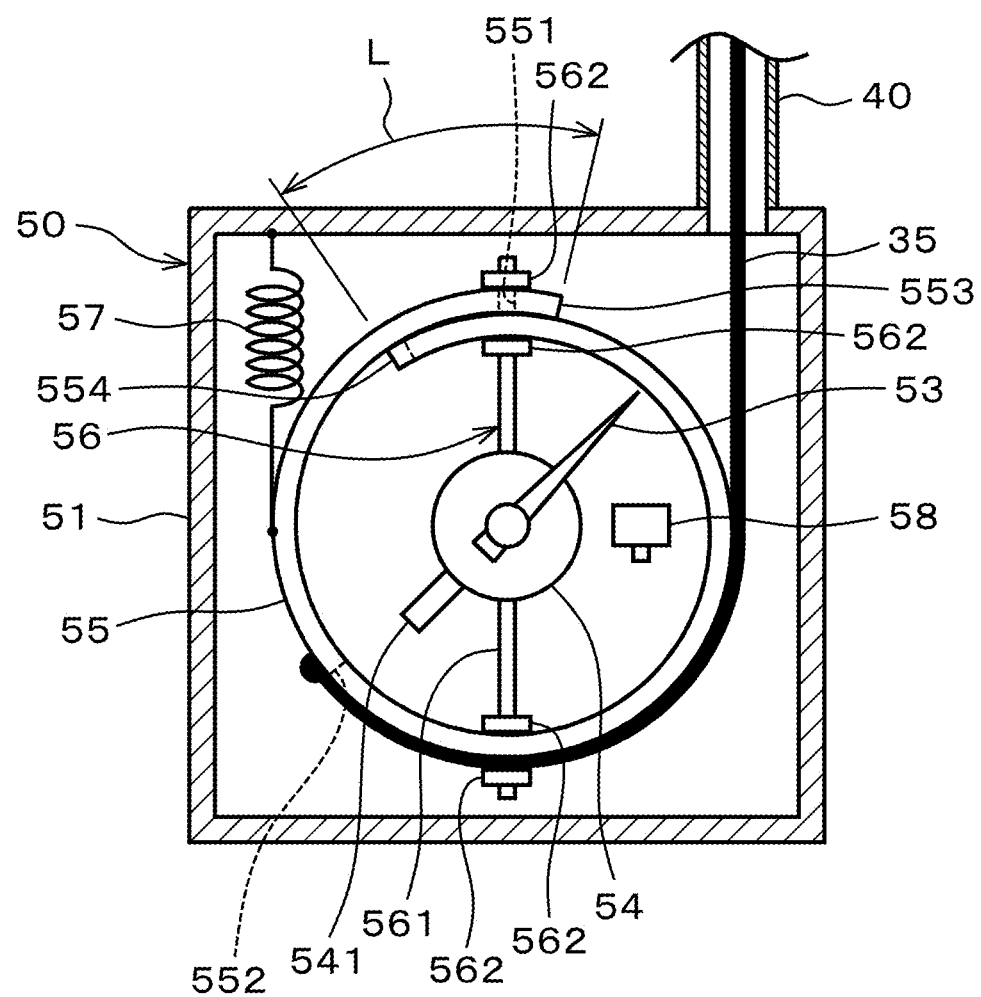
FIG. 4 is a view schematically illustrating an internal constitution of an indicator of the liquid level indicating device for the liquid-cooled electric appliance according to the first embodiment.

Moreover, the indicator 50 has a shaft portion 54, a rotary body 55, a support member 56, an urging member 57, and a micro switch 58 as illustrated in FIG. 4. The shaft portion 54, the rotary body 55, the support member 56, the urging member 57, and the micro switch 58 are accommodated in the case 51. The shaft portion 54 is a rotating shaft configured to have a columnar shape and is provided rotatably in the case 51. Moreover, the shaft portion 54 has a dog 541 for operating the micro switch 58. The micro switch 58 is operated by the dog 541 when the shaft portion 54 is rotated to a position where the indicating pointer 53 indicates the term "LOW". As a result, the liquid level indicating device 30 outputs a signal indicating that the cooling liquid 22 has lowered to a lowest position by an operation of the micro switch 58.

The rotary body 55 is formed having a substantially cylindrical shape or a so-called drum shape. The other end portion of the string member 35 pulled into the case 51 is connected to an outer peripheral surface of the rotary body 55. Thus, the string member 35 can be taken up by means of the rotation of the rotary body 55 in one direction or in a clockwise direction in this case. Moreover, the rotary body 55 is coupled with the shaft portion 54 through the support member 56. As a result, the rotary body 55 is rotatable around the shaft portion 54 in the case 51. That is, the shaft portion 54 is provided rotatably in conjunction with the rotation of the rotary body 55. That is, the rotary body 55 and the shaft portion 54 are integrally rotatable. In this case, the indicating pointer 53 is provided on the end portion of the shaft portion 54 and is integrally rotatable with the shaft portion 54. As a result, the indicating pointer 53 can indicate a rotation amount of the shaft portion 54, that is, a taken-up and withdrawn amount of the string member 35 as the liquid level position of the cooling liquid 22, that is, the remaining amount.

The urging member 57 is a tensile coil spring, for example. One end portion of the urging member 57 is fixed to the vicinity of the outer periphery of the rotary body 55, and the other end portion of the urging member 57 is fixed to an inner surface of the case 51. The urging member 57 is provided so as to urge the rotary body 55 to the taking-up direction of the string member 35 or the clockwise direction in this case. The urging member 57 is not limited to the tensile coil spring but may be a compression coil spring, a plate spring, a spiral spring and any other elastic members other than the spring, for example.

Here, when the cooling liquid 22 in the housing 21 increases, that is, when the liquid level position rises, the float 31 and the moving member 34 rise in conjunction with the rise of the liquid level position, whereby the string member 35 sags. On the other hand, when the cooling liquid 22 decreases, that is, when the liquid level position lowers, the float 31 and the moving member 34 lower in conjunction with the lowering of the liquid level position, whereby the string member 35 is pulled. Thus, an urging force of the urging member 57, that is, an elastic force is set to such strength that taking-up and withdrawing of the string member 35 can be performed in conjunction with the vertical movement of the float 31 and the moving member 34.

That is, the urging force of the urging member 57 is set to such a degree that, when the string member 35 sags due to the rise of the moving member 34, the rotary body 55 can be rotated toward the direction of taking-up of the string member 35 or on the clockwise side in this case, and when the string member 35 is pulled by the lowering of the moving member 34, the rotary body 55 can be rotated toward the direction where the string member 35 is withdrawn or on the counterclockwise side in this case. That is, the urging force made to act on the rotary body 55 by the urging member 57 is set smaller than a force of gravity acting on the float 31 and the moving member 34. In other words, a torque acting on the rotary body 55 by a tensile force of the string member 35 generated when the cooling liquid 22 decreases is larger than the torque acting on the rotary body 55 by the urging force of the urging member 57.

According to this constitution, when the cooling liquid 22 in the housing 21 increases, that is, when the liquid level position rises, and the float 31 and the moving member 34 rise, substantially at the same time when the string member 35 sags, the rotary body 55 rotates and takes up the sagging string member 35. That is, in this case, the rotary body 55 rotates in the clockwise direction in FIG. 4 and takes up the string member 35. On the other hand, when the cooling liquid 22 in the housing 21 decreases, that is, when the liquid level position lowers, and the float 31 and the moving member 34 lower, the string member 35 is pulled against the urging force of the urging member 57. Then, the rotary body 55 rotates in the puling direction of the string member 35, whereby the string member 35 is withdrawn from the case 51.

Then, when the rotary body 55 rotates as described above, the rotation of the rotary body 55 is transmitted to the indicating pointer 53 through the shaft portion 54. Then, the rotation of the rotary body 55 is stopped at a position where the urging force of the urging member 57 is balanced with the tensile force of the string member 35, whereby the rotation of the shaft portion 54 and the indicating pointer 53 is also stopped. The position indicated by the indicating pointer 53 at that time is the liquid level position of the cooling liquid 22 in the housing 21, that is, the remaining amount. Therefore, a user can check the remaining amount of the cooling liquid 22 by checking the position indicated by the indicating pointer 53.

Moreover, in the case of this embodiment, the rotary body 55 is made of metal, for example, and is formed by winding a rectangular plate member in a cylindrical shape. In this case, the rotary body 55 forms the cylindrical shape by overlapping both end portions of the rotary body 55 in the circumferential direction. And in the case of this embodiment, with regard to the rotary body 55, an outer diameter dimension of the rotary body 55, that is, an outer peripheral dimension of the rotary body 55 can be arbitrarily changed by adjusting an overlapping amount L on the both end portions thereof.

Figure 5:
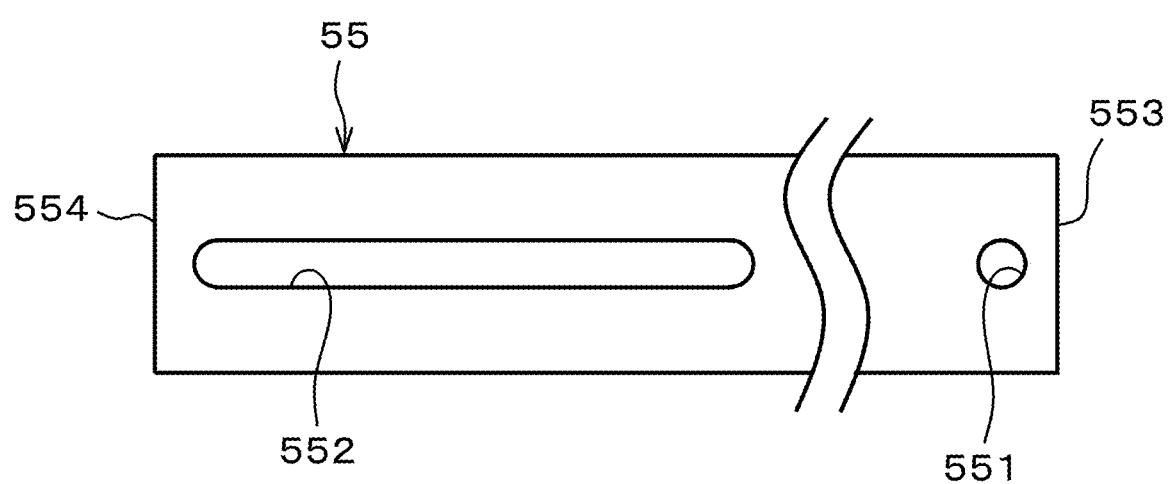
FIG. 5 is a view illustrating a rotary body of the liquid level indicating device for the liquid-cooled electric appliance according to the first embodiment in an extended manner.

In this case, the rotary body 55 has a first hole portion 551 and a second hole portion 552 as illustrated in FIG. 5. The first hole portion 551 is provided closer to an end portion on one side of the rectangular plate-shaped member and is formed by penetrating the rotary body 55 in a thickness direction in a circular shape. The second hole portion 552 is provided closer to the end portion on the other side of the rectangular plate-shaped member and is formed by penetrating the rotary body 55 in the thickness direction in a long-hole shape.

The support member 56 is constituted by one rod screw 561 and four nuts 562, for example. In this case, an inner diameter of the first hole portion 551 and a width dimension of the second hole portion 552 in a short direction are set to dimensions slightly larger than an outer diameter of the rod screw 561. The rod screw 561 is provided by penetrating the rotary body 55 and the shaft portion 54 in a direction perpendicular to an axial direction of the shaft portion 54. Then, both end portions of the rod screw 561 are fixed by the nuts 562. That is, with respect to the rotary body 55 wound in a cylindrical shape, the rod screw 561 is passed through the first hole portion 551 and the second hole portion 552 from one side of the rotary body 55 in a radial direction and penetrates the shaft portion 54 and then, is further passed through the second hole portion 552 on the other side in the radial direction.

Here, in the rotary body 55, assume that the end portion on the first hole portion 551 side in the longitudinal direction when the rotary body 55 is extended is a first end portion 553, and an end portion on the second hole portion 552 side is a second end portion 554. In this case, when the nuts 562 on the both ends of the rod screw 561 are moved to the shaft portion 54 side, respectively, that is, to a center side of the rotary body 55 in the radial direction, the second end portion 554 of the rotary body 55 is moved toward a direction away from the first end portion 553, that is, toward a direction where the overlapping amount L increases. As a result, the outer peripheral dimension of the rotary body 55 is made smaller and as a result, the outer diameter of the rotary body 55 is made smaller. Moreover, when the nuts 562 of the both ends of the rod screw 561 are moved to the shaft portion 54 side, that is, to an outer side of the rotary body 55 in the radial direction, the second end portion 554 of the rotary body 55 is moved toward the direction getting closer to the first end portion 553, that is, toward the direction where the overlapping amount L decreases. As a result, the outer peripheral dimension of the rotary body 55 is made larger, and as a result, the outer diameter of the rotary body 55 is made larger.

In this case, a variation amount of the liquid level of the cooling liquid 22, that is, a moving amount of the moving member 34 in the vertical direction is equal to the taken-up and withdrawn amount of the string member 35 by the rotary body 55. The rotation amount of the rotary body 55, that is, a rotating angle is correlated with the taken-up and withdrawn amount of the string member 35 by the rotary body 55. The rotation amount of the rotary body 55 is the same as the rotation amounts of the shaft portion 54 and the indicating pointer 53. In this case, if the variation amount of the liquid level of the cooling liquid 22 is the same, when the outer diameter, that is, the outer peripheral dimension of the rotary body 55 is made larger, the rotation amount of the rotary body 55 is made smaller, and when the outer diameter of the rotary body 55 is made smaller, the rotation amount of the rotary body 55 is made larger. Therefore, the user can change the rotation amounts of the shaft portion 54 and the indicating pointer 53 to the variation amount of the liquid level of the cooling liquid 22 by changing the outer diameter of the rotary body 55.

According to the embodiment described above, the liquid level indicating device 30 includes the moving member 34, the string member 35, the tube member 40, and the indicator 50. The moving member 34 is arranged in the liquid tank in which the cooling liquid is stored or in the housing 21 in this case and is moved vertically in conjunction with the variation in the liquid level of the cooling liquid 22. The string member 35 has one end portion connected to the moving member 34 and is configured to be bendable and non-extendable in the longitudinal direction. The indicator 50 is connected to the other end portion of the string member 35 and indicates the height position of the moving member 34 as the liquid level position of the cooling liquid 22, that is, the remaining amount. The tube member 40 is configured to be bendable and non-extendable in the longitudinal direction. Moreover, the tube member 40 has the string member 35 passed therethrough and connects the housing 21 which is the liquid tank and the indicator 50.

Moreover, the indicator 50 has the case 51, the indicating pointer 53, the rotary body 55, the shaft portion 54, and the urging member 57. The indicating pointer 53 is provided on the shaft portion 54 in the case 51 and indicates the rotation amount of the shaft portion 54 as the liquid level position of the cooling liquid 22, that is, the remaining amount. The rotary body 55 is provided rotatably in the case 51. The other end portion of the string member 35 is connected to the outer peripheral surface of the rotary body 55. As a result, the rotary body 55 can take up the string member 35. The shaft portion 54 is provided rotatably in conjunction with the rotation of the rotary body 55. The urging member 57 urges the rotary body 55 to the taking-up direction of the string member 35 or the counterclockwise direction in FIG. 4 in this case.

According to the above, the liquid level position of the cooling liquid 22 in the housing 21 is transmitted to the indicator 50 through the string member 35. Thus, the user can check the liquid level position of the cooling liquid 22, that is, the remaining amount only by looking at the indication indicated by the indicating pointer 53 of the indicator 50. In this case, the user does not have to perform a special operation such as pulling out of the string member 35 from the case 51 of the indicator 50 and directly checking a length of the string member 35, for example. Therefore, the user can easily check the liquid level position of the cooling liquid 22, that is, the remaining amount.

Then, the string member 35 is passed through the tube member 40 connecting the housing 21 and the indicator 50. Thus, the mounting position of the indicator 50 can be adjusted by adjusting the length dimensions of the string member 35 and the tube member 40. Therefore, the mounting position of the indicator 50 is not limited to the vicinity of the liquid level of the cooling liquid 22. Thus, even if the housing 21 is large, and the liquid level position of the housing 21 is high, for example, the user can mount the indicator 50 at a position easy to be seen on a lower part of the housing 21, that is, in the vicinity of an installation surface 100. As a result, visibility of the indicator 50 can be improved.

Moreover, the tube member 40 is constituted by a bellows member made of metal or a resin and is configured to be relatively flexible and bendable. Thus, the mounting position of the indicator 50 is hardly limited to how to wind, the length dimension and the like of the tube member 40, and thus, a degree of freedom in the mounting position of the indicator 50 can be improved.

The string member 35 and the tube member 40 are configured to be non-extendable in the longitudinal direction but in this embodiment, the term "non-extendable" is not limited to a case of completely non-extendable. That is, the string member 35 and the tube member 40 are allowed to be extended and contracted to such a degree that does not affect indication accuracy by the indicator 50. Moreover, if the string member 35 and the tube member 40 are extended and contracted, that is, expanded by an influence of a temperature or the like, it is preferable that the string member 35 and the tube member 40 have extension and contraction rates, that is, expansion rates which are equal or as close as possible.

Here, when the remaining amount of the cooling liquid 22 is indicated by a ratio to the maximum amount which can be stored in the housing 21, even if the moving amount of the moving member 34 in the vertical direction is the same, if a shape or a capacity of the housing 21 is different, a change ratio of the cooling liquid 22 is also different. For example, consider two liquid tanks having sectional areas of S1 and S2 and a height position of the maximum liquid level of the cooling liquid 22 being H. In this case, if the liquid level of the cooling liquid 22 decreased for a dH portion, in the liquid tank with the sectional area of S1, a decreasing ratio is dH/(S1×H). On the other hand, in the liquid tank with the sectional area of S2, the decreasing ratio is dH/(S2×H). In this case, assuming that it is S1>S2, dH/(S1×H)<dH/(S2×H). That is, even if the cooling liquid 22 decreases for the same height dH portion, the decreasing ratio is larger for the liquid tank with the smaller sectional area of S2 than the liquid tank with the larger sectional area of S1. This also applies to the case where the cooling liquid 22 increases for the height dH portion.

As described above, even if the height dimension dH of an increase and a decrease of the liquid level is the same, if the shape or the capacity of the housing 21 is different, a ratio of the increase or decrease amount to the maximum amount which can be stored in the housing 21 is not the same. Thus, if the shape or the capacity of the housing 21 is changed, the ratio of the increase or decrease amount of the cooling liquid 22 to the rotation amount of the indicating pointer 53 is also changed. Therefore, if the shape or the capacity of the housing 21 on which the liquid level indicating device 30 is to be mounted is changed, indication contents of the indicating portion 52 need to be changed in accordance with the housing 21. However, it is cumbersome to change the indication contents of the indicating portion 52 each time the shape or the capacity of the housing 21 is changed.

Thus, in this embodiment, the indicator 50 is configured such that the rotation amount of the shaft portion 54 to a taking-up amount of the string member 35 by the rotary body 55 can be changed. The user can match a value indicated by the indicating pointer 53 by the moving member 34 with the shape or the capacity of the housing 21 by changing the rotation amount of the shaft portion 54 to the taking-up amount of the string member 35 by the rotary body 55. Thus, according to the above, even if the housing 21 on which the liquid level indicating device 30 is to be mounted is changed, the change can be easily handled.

In this case, the rotary body 55 is formed by winding a plate member in a cylindrical shape and is configured such that an outer diameter can be changed by changing the overlapping amount L on both end portions of the plate member. That is, the rotation amount of the shaft portion 54 to the taking-up amount of the string member 35 by the rotary body 55 can be changed by changing the outer diameter of the rotary body 55 through the adjustment of the overlapping amount L of the rotary body 55. Thus, the user can more easily handle the change of the housing 21 on which the liquid level indicating device 30 is to be mounted.

Moreover, the liquid level indicating device 30 includes the float 31 and the extension and contraction portion 32. The float 31 is configured to float on the cooling liquid 22. The extension and contraction portion 32 is configured to be capable of extension and contraction with the movement of the float 31 in the vertical direction. Moreover, the moving member 34 is provided inside the extension and contraction portion 32. The inside of the case 51, the inside of the tube member 40, and the inside of the extension and contraction portion 32 communicate with each other and are configured in the sealed space having air tightness and water tightness. According to the above, entry of humidity or the cooling liquid 22 through any of the case 51, the tube member 40 or the extension and contraction portion 32, which causes the indicating portion 52 to get steamy, or deterioration of electronic instruments provided in the case 51 such as the micro switch 58, for example, can be prevented.

Second Embodiment

Figure 6:
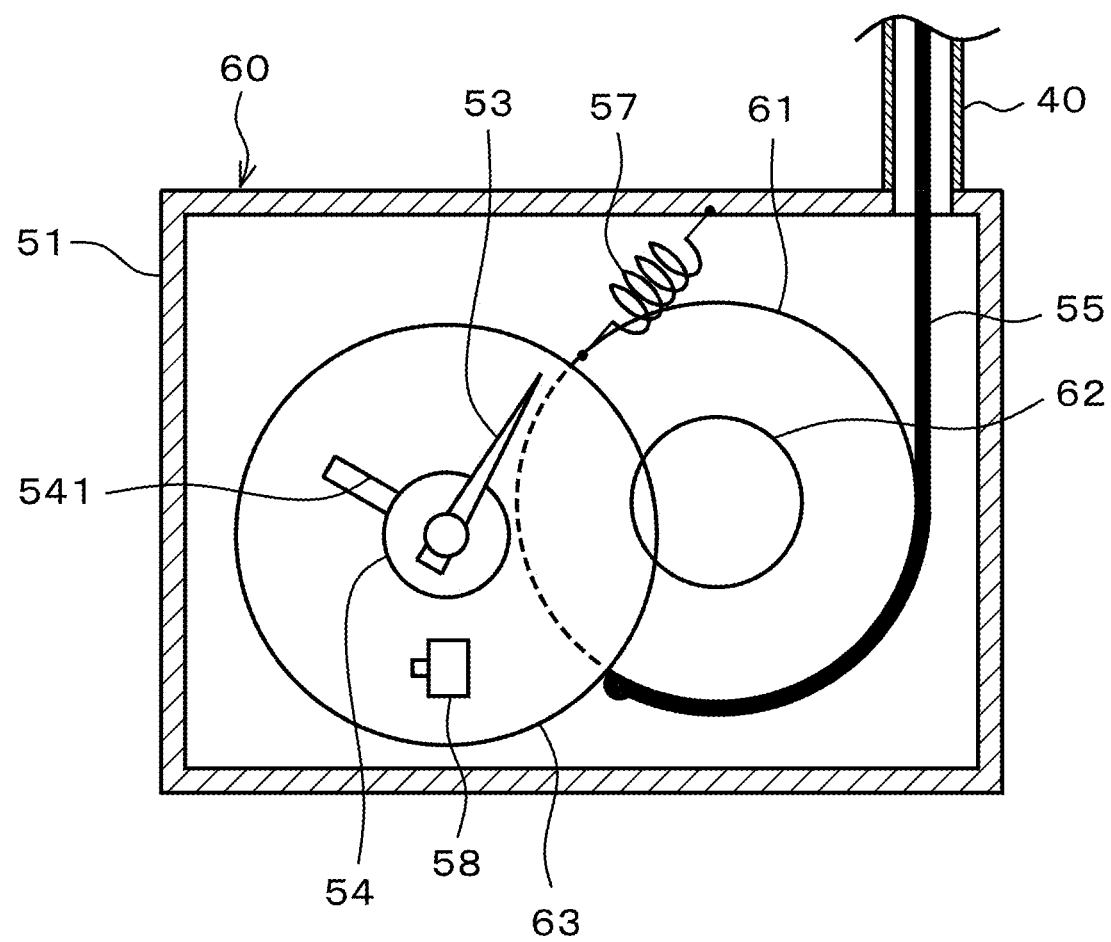
FIG. 6 is a view schematically illustrating an internal constitution of an indicator of the liquid level indicating device for the liquid-cooled electric appliance according to a second embodiment.

Next, a second embodiment will be described by referring to FIG. 6.

In the second embodiment, a specific constitution of an indicator 60 is different from the indicator 50 in the first embodiment. That is, the indicator 60 in the second embodiment has a rotary body 61, a main driving gear 62, and a driven gear 63 in addition to the case 51, the indicating portion 52, the indicating pointer 53, the shaft portion 54, and the urging member 57. The indicating portion 52 has the constitution similar to the indicating portion 52 in FIG. 3, but it is not illustrated in FIG. 6. The rotary body 61 is formed having a columnar or a cylindrical shape, that is, a drum shape and is provided rotatably in the case 51. To an outer peripheral surface of the rotary body 61, similarly to the rotary body 55 in the first embodiment, the other end portion of the string member 35 pulled into the case 51 is connected. That is, the rotary body 61 has a function similar to that of the rotary body 55 in the aforementioned first embodiment except the constitution that the outer diameter cannot be changed.

The main driving gear 62 has the same rotating shaft as the rotary body 61 and is configured to be integrally rotatable with the rotary body 61. The driven gear 63 has the same rotating shaft as the shaft portion 54 and is configured to be integrally rotatable with the shaft portion 54. And the main driving gear 62 and the driven gear 63 are meshed with each other. Thus, rotation of the rotary body 61 is transmitted to the shaft portion 54 through the main driving gear 62 and the driven gear 63. According to the above, a working effect similar to that of the aforementioned first embodiment can be obtained. Moreover, according to this embodiment, the rotation amount of the shaft portion 54 to the taking-up amount of the string member 35 by the rotary body 61 can be easily changed without changing the outer diameter of the rotary body 61 but only by changing a gear ratio between the main driving gear 62 and the driven gear 63.

Third Embodiment

Next, a third embodiment will be described by referring to FIG. 7.

In the third embodiment, a specific constitution of an indicator 70 is different from the indicators 50 and 60 in each of the aforementioned embodiments. That is, in each of the aforementioned embodiments, the indicators 50 and 60 are operated by converting the movement of the moving member 34 in the vertical direction with the variation in the liquid level to rotary motions of the rotary bodies 55 and 61 through the string member 35. On the other hand, in the third embodiment, the indicator 70 is operated by converting the movement of the moving member 34 in the vertical direction with the variation in the liquid level to a motion in a linear direction through the string member 35.

The indicator 70 has a case 71, an indicating portion 72, an indicating pointer 73, a guide shaft 74, a mover 75, and an urging member 76. The indicating portion 72, the indicating pointer 73, the guide shaft 74, the mover 75, and the urging member 76 are accommodated in the case 71. In this case, a surface of the case 71 on the worker side is constituted by a transparent member, for example, and as a result, at least the indicating portion 72 and the indicating pointer 73 can be visually recognized from the outside of the case 71. Moreover, the tube member 40 is connected to an upper surface side of the case 71. As a result, the string member 35 is withdrawn into the case 71 from the upper side of the case 71.

The indicating portion 72 is for indicating the liquid level position of the cooling liquid 22 in the housing 21, that is, the remaining amount similarly to the indicating portion 52 of the aforementioned embodiment. In this case, the indicating portion 72 is for indicating the current liquid level of the cooling liquid 22 in the housing 21 by a ratio to the maximum liquid level which can be stored in the housing 21. The indication contents of the indicating portion 72, that is, numeral values, characters and the like indicating the remaining amount are arranged on a straight line in the vertical direction.

The guide shaft 74 is a so-called sliding shaft formed having a columnar shape, for example, and the guide shaft 74 is provided to extend in one direction or in the vertical direction in this case in the case 71. The guide shaft 74 extends along a direction where the string member 35 withdrawn into the case 71 is extended as illustrated in FIG. 7. The mover 75 is provided slidably on the guide shaft 74. As a result, the mover 75 is linearly movable toward the direction where the string member 35 is extended along the guide shaft 74. The indicating pointer 73 is provided on the mover 75 and is moved with the movement of the mover 75.

An end portion of the string member 35 on the inner side of the case 71 is provided on the mover 75. The urging member 76 is provided on the mover 75. The urging member 76 causes the urging force in a direction to be pulled into the case 71 or downward in this case to act on the mover 75. The urging member 76 is a weight, for example. In this case, the urging member 76 urges the mover 75 downward by its own weight. As a result, a tensile force to be pulled into the case 71, that is, to be pulled downward acts on the string member 35 at all times.

In this case, the urging force of the urging member 76, that is, a weight of the urging member 76 is set to such strength that pulling-in and withdrawing of the string member 35 can be performed with the vertical movement of the float 31 and the moving member 34 due to the variation in the cooling liquid 22 in the housing 21. The urging member 76 is not limited to a weight but may be an elastic member such as a tensile coil spring, for example.

In this constitution, when the cooling liquid 22 in the housing 21 decreases and the liquid level lowers, the float 31 and the moving member 34 move downward. At that time, the string member 35 is pulled in a direction where it is withdrawn from the case 71, whereby the mover 75 and the indicating pointer 73 are moved to an upper side along the guide shaft 74. On the other hand, when the cooling liquid 22 in the housing 21 increases, and the liquid level rises, the float 31 and the moving member 34 move upward, whereby the string member 35 sags. At that time, the string member 35 is pulled into the case 71 by the urging force of the urging member 76. Then, the movement of the mover 75 is stopped at a position where the urging force of the urging member 76 is balanced with the tensile force of the string member 35. The position indicated by the indicating pointer 53 at that time is the liquid level position of the cooling liquid 22 in the housing 21, that is, the remaining amount. Therefore, the user can check the remaining amount of the cooling liquid 22 by checking the position indicated by the indicating pointer 53.

According to this embodiment, a working effect similar to that of each of the aforementioned embodiments can be obtained. Moreover, according to this embodiment, the indicator 70 does not need the rotary body 55, 61 or the like. Therefore, the constitution of the indicator 70 can be made simpler as compared with each of the aforementioned embodiments.

Figure 7:
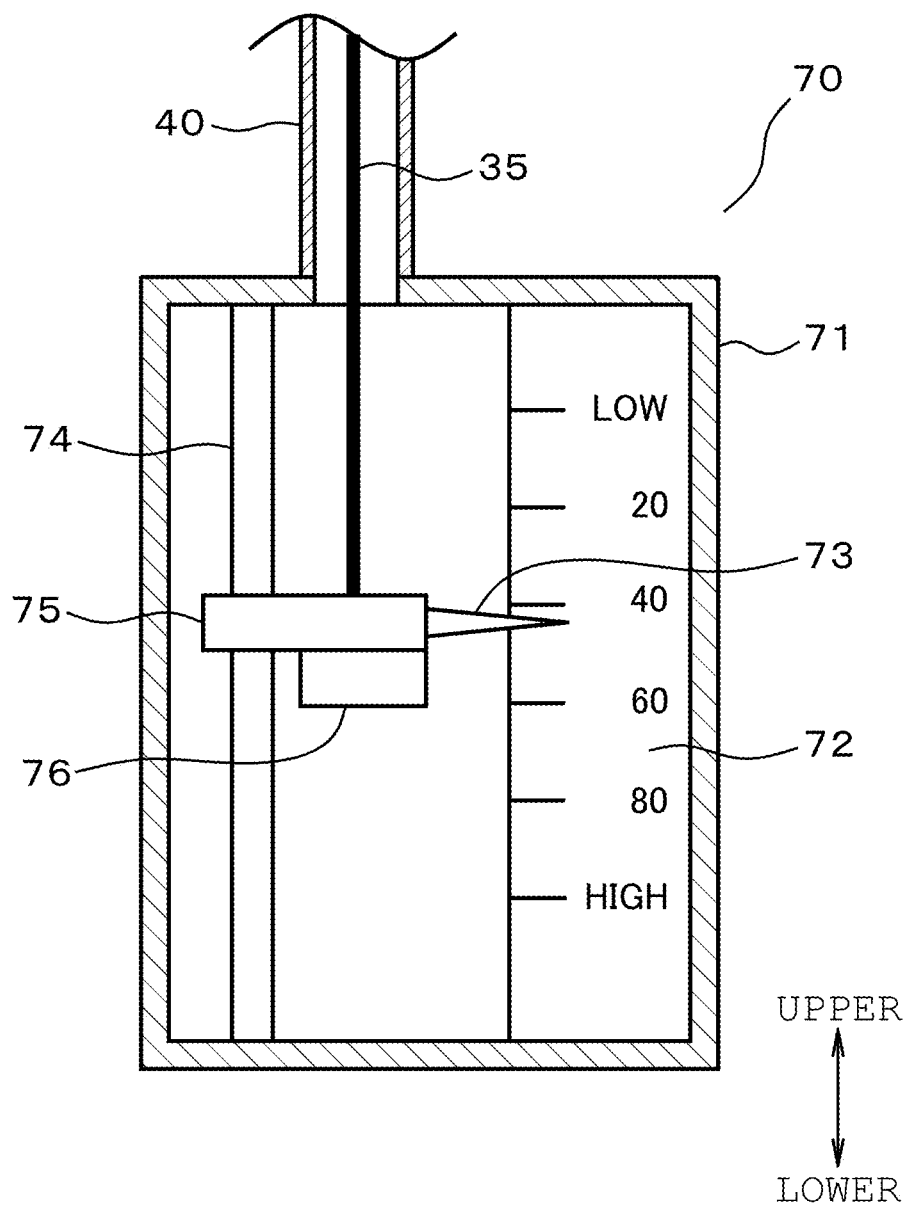
FIG. 7 is a view schematically illustrating an internal constitution of the indicator of the liquid level indicating device for the liquid-cooled electric appliance according to a third embodiment.
Figure 8:
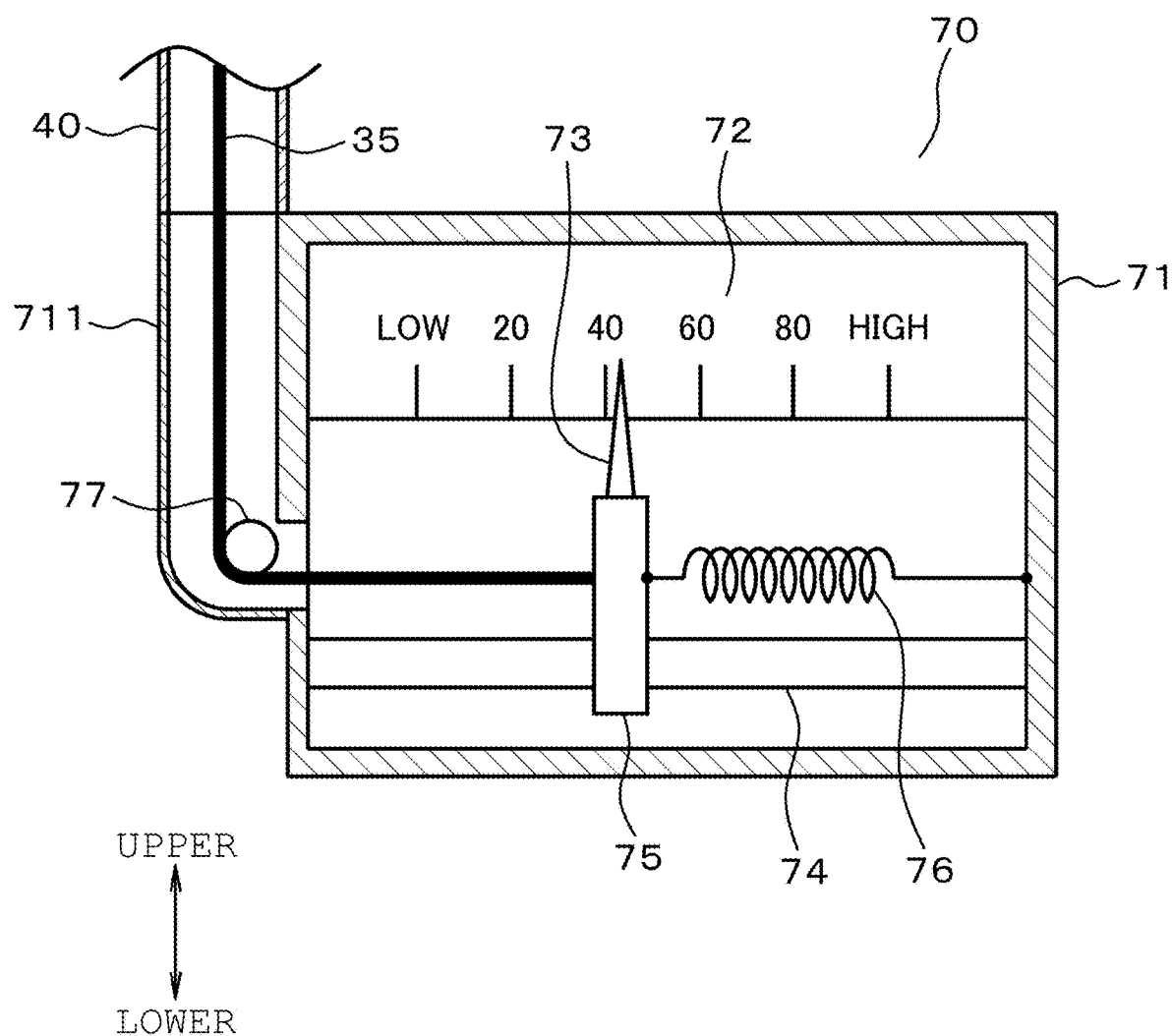
FIG. 8 is a view schematically illustrating another example of the internal constitution of the indicator of the liquid level indicating device for the liquid-cooled electric appliance according to the third embodiment (No. 1).
Figure 9:
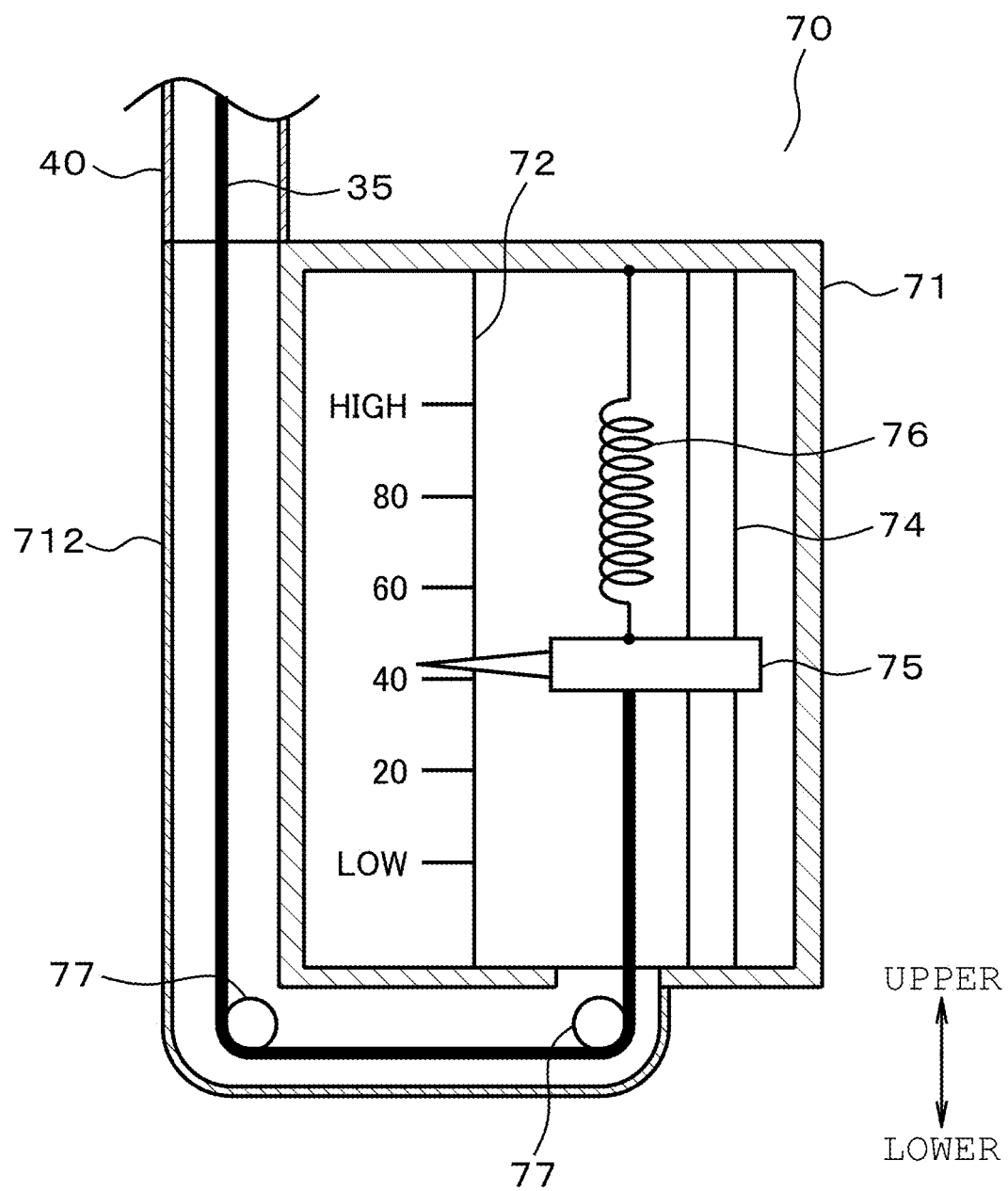
FIG. 9 is a view schematically illustrating another example of the internal constitution of the indicator of the liquid level indicating device for the liquid-cooled electric appliance according to the third embodiment (No. 2).

The indicator 70 in FIG. 7 may be configured to be directed laterally as illustrated in FIG. 8, for example, or the indicator 70 in FIG. 7 may be configured to be directed upside down as illustrated in FIG. 9. In this case, in FIGS. 8 and 9, the indicator 70 has a compression coil spring as the urging member 76. Moreover, in this case, the mover 75 in the indicator 70 in FIG. 7 moves in the horizontal direction, and the mover 75 in the indicator 80 in FIG. 8 moves in the vertical direction.

In the indicator 70 illustrated in FIGS. 8 and 9, the case 71 has introduction portions 711 and 712. The introduction portions 711 and 712 are formed integrally with the case 71, for example, and are formed having a tube shape and cause an inside and an outside of the case 71 to communicate with each other. One end portions of the introduction portions 711 and 712 are open toward an upper side of the case 71. In the indicator 70 illustrated in FIG. 8, the other end portion of the introduction portion 711 is open into the case 71 on a side surface side of the case 71. Moreover, in the indicator 70 illustrated in FIG. 9, the other end portion of the introduction portion 712 is open into the case 71 on a lower surface side of the case 71. Then, the string member 35 is passed through the introduction portions 711 and 712 and pulled into the case 71 from the side surface side of the case 71.

In this case, the string member 35 is bent when it is passed through the introduction portions 711 and 712 and pulled into the case 71. Thus, the indicator 70 in FIGS. 8 and 9 has a rotatable pulley 77. The pulley 77 is provided on a portion where the string member 35 is bent in the introduction portions 711 and 712 and supports the portion where the string member 35 is bent. As a result, the movement of the string member 35, that is, the pulling into the case 71 and the withdrawal to the outside of the case 71 are made smooth. The pulley 77 may be provided outside the case 71.

Fourth Embodiment

Figure 10:
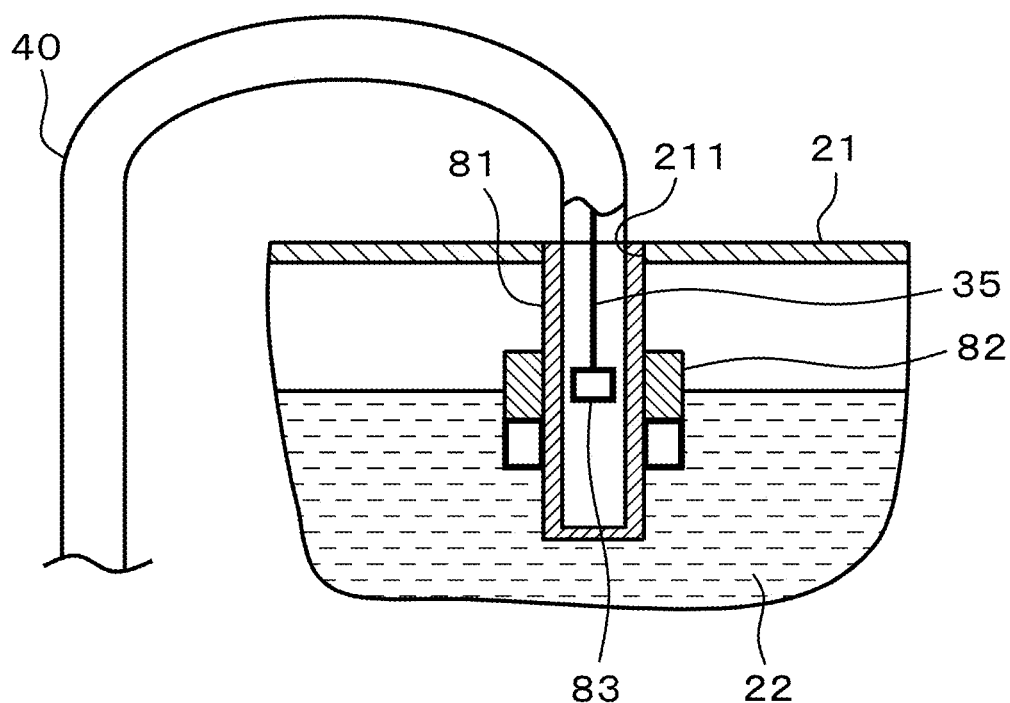
FIG. 10 is a view schematically illustrating constituent elements of the liquid level indicating device arranged in a housing of the liquid-cooled electric appliance according to a fourth embodiment.

Next, a fourth embodiment will be described by referring to FIG. 10.

In the fourth embodiment, a specific constitution inside the housing 21 in the liquid level indicating device 30 is different from each of the aforementioned embodiments. That is, in the fourth embodiment, the liquid level indicating device 30 includes a cylindrical member 81, a float 82, and a moving member 83. The cylindrical member 81 is formed cylindrically by non-ferrous not having magnetism, a resin or the like. A lower end portion of the cylindrical member 81 is closed, while an upper end portion is open.

The cylindrical member 81 is arranged in the housing 21 which is the liquid tank. The upper end portion of the cylindrical member 81 is passed inside of the communication portion 211. In this case, an outer side portion of the cylindrical member 81 and an inner side portion of the communication portion 211 are in close contact in a state having air tightness and water tightness. Moreover, the lower end portion of the cylindrical member 81 extends lower than the liquid level when at least the maximum amount of the cooling liquid 22 is stored, that is, the maximum liquid level position so that it sinks in the cooling liquid 22.

The float 82 is configured to be capable of floating on the cooling liquid 22 by forming a part of an inside hollowly, for example. Moreover, the float 82 is formed having a columnar shape so as to cover an outer peripheral side of the cylindrical member 81, for example. When the liquid level of the cooling liquid 22 changes, the float 82 is moved vertically along the outer peripheral surface of the cylindrical member 81 with the variation.

The moving member 83 is arranged in the housing 21 and also in the cylindrical member 81. And the float 82 and the moving member 83 are configured so that an attracting force by a magnetic force acts on each other. That is, at least either one of the float 82 and the moving member 83 is constituted by a magnet. Moreover, in this case, the one which is not a magnet of the float 82 and the moving member 83 is constituted by metal having magnetism. The inside of the case 51, the inside of the tube member 40, and the inside of the cylindrical member 81 communicate with each other and are configured in a sealed space having air tightness and water tightness.

According to the above, too, a working effect similar to each of the aforementioned embodiments can be obtained.

Fifth Embodiment

Figure 11:
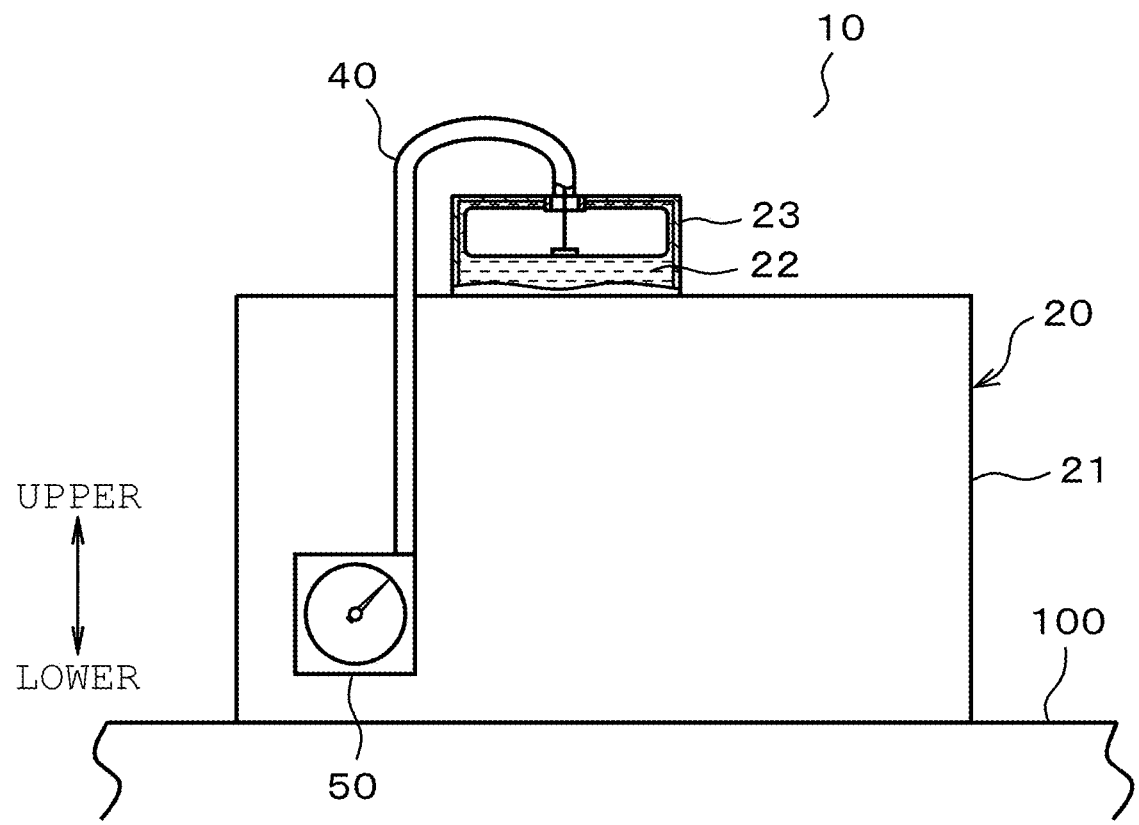
FIG. 11 is a view illustrating a schematic constitution of the liquid-cooled electric appliance according to a fifth embodiment.
Figure 12:
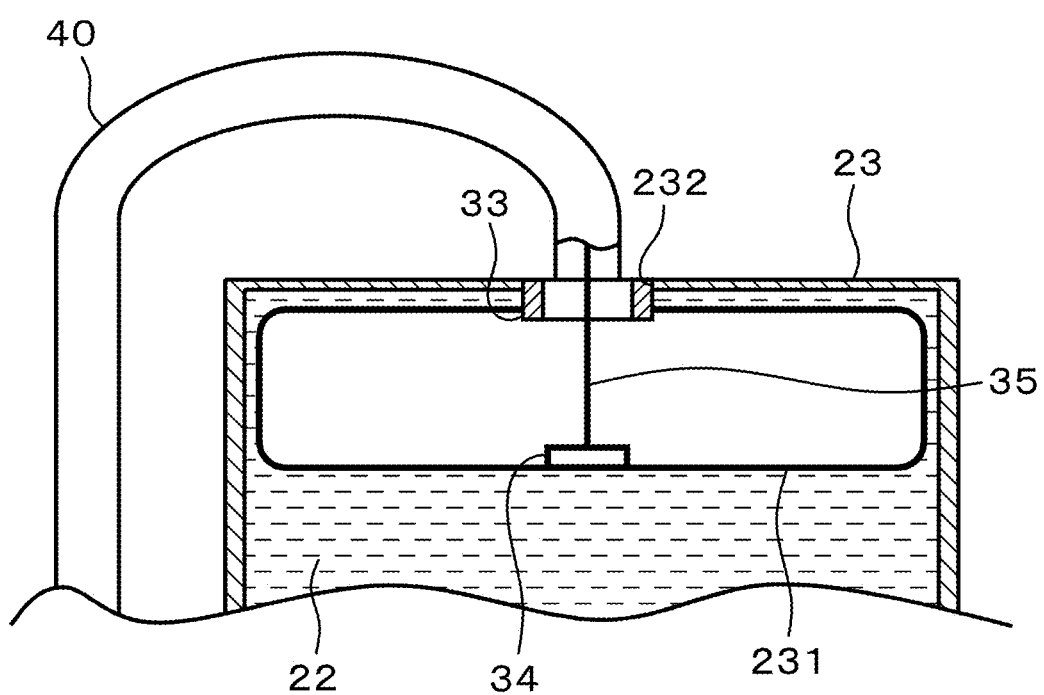
FIG. 12 is a view schematically illustrating constituent elements of the liquid level indicating device arranged in a conservator of the liquid-cooled electric appliance according to the fifth embodiment.

Next, a fifth embodiment will be described by referring to FIGS. 11 and 12.

In the fifth embodiment, the liquid-cooled electric appliance 10 further includes a conservator 23. In this case, the liquid level indicating device 30 indicates the remaining amount of the cooling liquid 22 in the conservator 23. The conservator 23 has a known constitution and as illustrated in FIG. 12, has an air bag 231 which absorbs the variation in the cooling liquid 22 therein. Moreover, the conservator 23 has a communication portion 232 which causes the inside and the outside to communicate with each other. The communication portion 232 of the conservator 23 has a function similar to the communication portion 211 of the housing 21 in the aforementioned embodiment. That is, the fixing member 33 is passed through the communication portion 232 and is fixed.

The moving member 34 of the liquid level indicating device 30 is provided on the inner surface on the lower side in the air bag 231. In this case, the moving member 34 is for fixing the one end portion of the string member 35 to the lower-side inner surface of the air bag 231 and may be an adhesive tape or an adhesive, for example. Moreover, the moving member 34 and the air bag 231 may be integrally formed. And the inside of the case 51, the inside of the tube member 40, and the inside of the air bag 231 communicate with each other and are configured in a sealed space having air tightness and water tightness.

According to this constitution, too, a working effect equivalent to that of each of the aforementioned embodiments can be obtained. That is, when the remaining amount of the cooling liquid 22 in the conservator 23 changes and the air bag 231 is expanded or contracted, the moving member 34 moves in the vertical direction by the expansion or contraction of the air bag 231. Then, the movement of the moving member 34 in the vertical direction is transmitted to the indicator 50 through the string member 35, and the indicating pointer 53 is rotated. As a result, the user can easily check the remaining amount of the cooling liquid 22 in the conservator 23 similarly to each of the aforementioned embodiments by reading contents indicated by the indicating pointer 53 of the indicator 50.

Each of the aforementioned embodiments may be configured as follows, for example. That is, instead of the indicating portion 52 and the indicating pointer 53, a digital indicating portion capable of segment indication is provided, and an encoder which detects a rotation amount of the rotary body 55, 61 or the shaft portion 54 is provided, for example. Then, the remaining amount of the cooling liquid 22 is digitally indicated on the digital indicating portion on the basis of a detection result of the encoder, that is, the rotation amount of the rotary body 55, 61. According to this, too, a working effect similar to that in each of the aforementioned embodiments can be obtained.

Sixth Embodiment

The sixth embodiment will be described by referring to FIGS. 13 to 19. In the following description, a perpendicular direction to an installation surface 300 of a liquid-cooled electric appliance 310 is assumed to be a vertical direction of the liquid-cooled electric appliance 310. Moreover, a clockwise direction or a counterclockwise direction which is a rotating direction of a rotary body 355 of an indicator 350 is assumed to mean the rotating direction when the indicator 350 is seen from a scale plate 352 direction.

Figure 13:
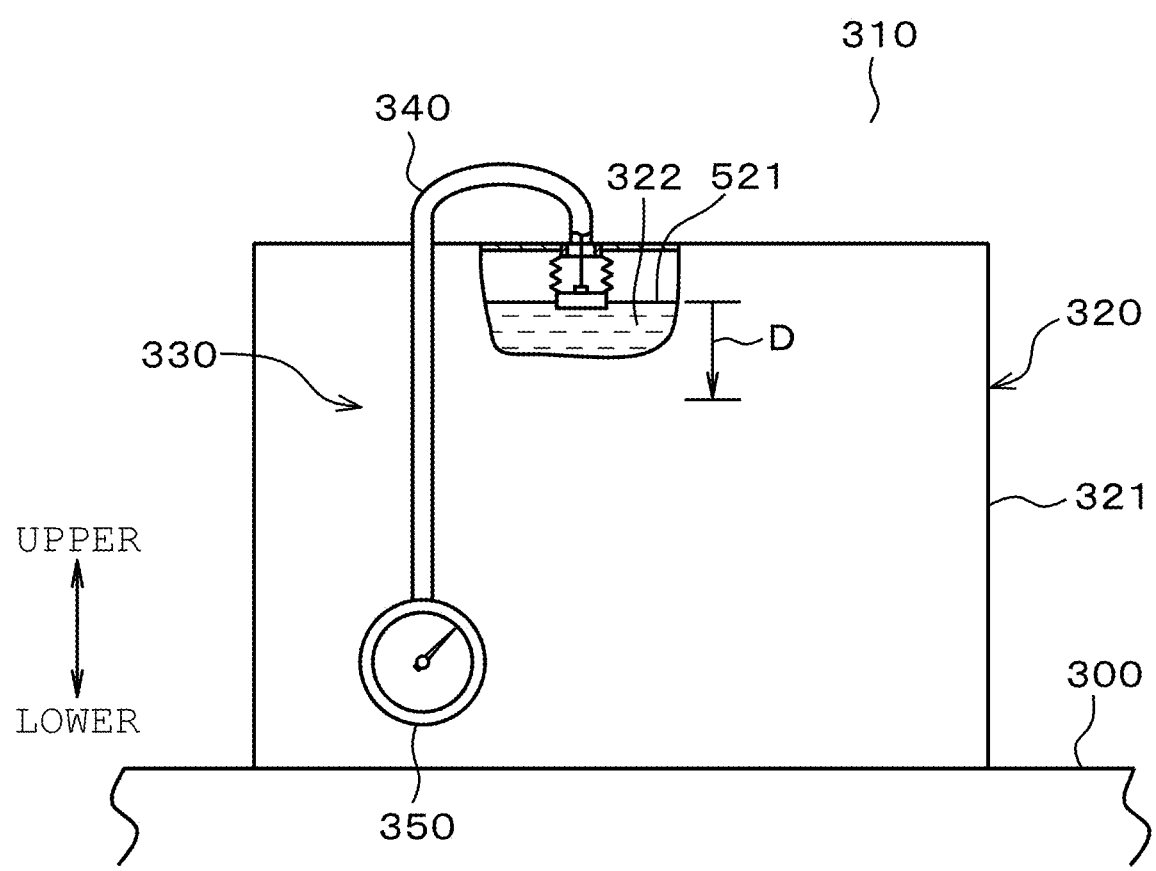
FIG. 13 is a view illustrating a schematic configuration of the liquid-cooled electric appliance according to a sixth embodiment.

FIG. 13 is a view illustrating a schematic constitution of the liquid-cooled electric appliance according to the sixth embodiment. The liquid-cooled electric appliance 310 illustrated in FIG. 13 includes an electric appliance body 320 and a liquid level indicating device 330. The electric appliance body 320 has a housing 321 as an outer shell. The housing 321 accommodates electric appliances such as a transformer and a reactor, not shown, therein.

Inside the housing 321, a cooling liquid 322 such as an insulating oil and liquid silicone is stored as a liquid, and the electric appliance, not shown, accommodated in the housing 321 is immersed in the cooling liquid 322. The housing 321 functions as a liquid tank which accommodates the electric appliance and also stores the cooling liquid 322. As a result, the electric appliance, not shown, accommodated in the housing 321 is cooled by the cooling liquid 322.

An upper surface of the cooling liquid 322 is a liquid level 522. Since the cooling liquid 322 is expanded or contracted by a temperature, a height of the liquid level 522 changes in accordance with that. Here, a fluctuation width of the liquid level 522 is assumed to be a variation amount D.

Figure 14:
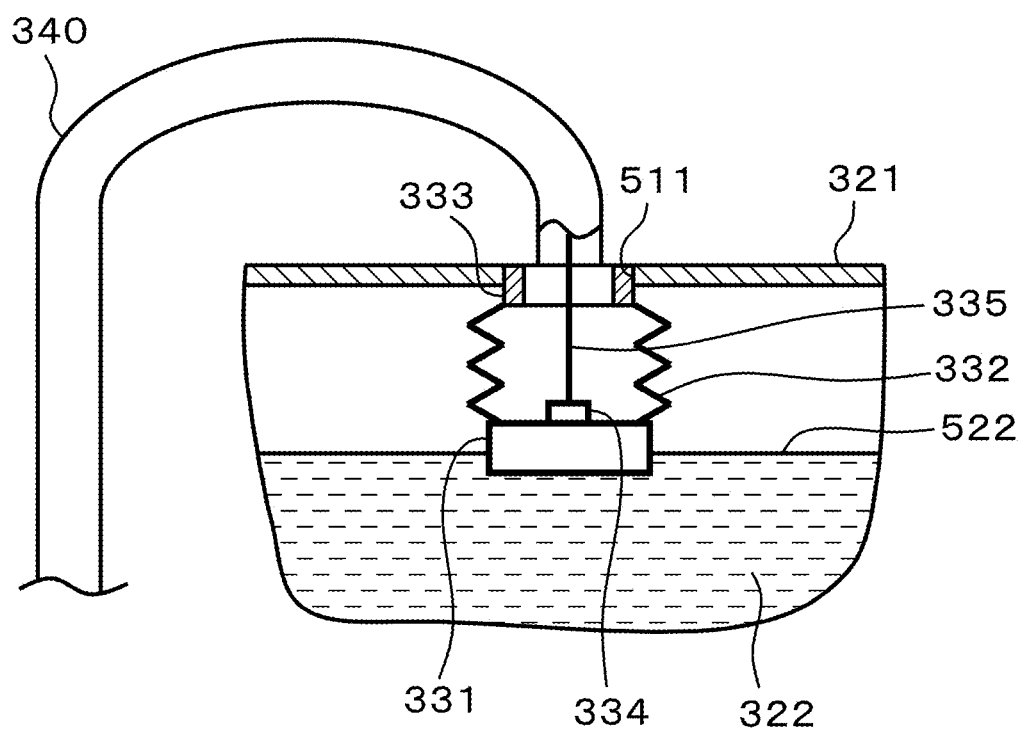
FIG. 14 is a view schematically illustrating constituent elements of the liquid level indicating device arranged in the housing of the liquid-cooled electric appliance.

FIG. 14 is a view schematically illustrating constituent elements of the liquid level indicating device 330 arranged in the housing 321 of the liquid-cooled electric appliance 310. The housing 321 has a communication portion 511 as illustrated in FIG. 14. The communication portion 511 is formed by penetrating an upper surface of the housing 321 circularly, for example, and causes an inside and an outside of the housing 321 to communicate with each other.

The liquid level indicating device 330 is provided on the housing 321 of the electric appliance body 320 as illustrated in FIG. 13 and indicates a height position of the liquid level of the cooling liquid 322 in the housing 321, that is, the remaining amount. Specifically, the liquid level indicating device 330 has a tube member 340 and the indicator 350. The indicator 350 is arranged on an arbitrary surface of the housing 321 and at a height position easy to be seen by the worker.

The tube member 340 connects the housing 321 which is the liquid tank and the indicator 350. In the case of this embodiment, the tube member 340 is a hollow tube constituted by a bellows member made of metal or a resin, for example, and is configured to be relatively flexibly bendable and non-extendable in the longitudinal direction. The tube member 340 can be flexibly bent with the change of a mounting position of the indicator 350. Thus, the user can arbitrarily change the mounting position of the indicator 350 without being much limited by the arrangement of the tube member 340.

The liquid level indicating device 330 has, as also illustrated in FIG. 14, a float 331, an extension and contraction portion 332, a fixing portion 333, a moving member 334, and a string member 335.

The float 331 has a hollow shape, for example, and is configured so as to float on the cooling liquid 322. The float 331 is made to float on the liquid level 522 of the cooling liquid 322 in the housing 321 in the arrangement. The float 331 is also a moving member which moves with the variation in the liquid level 522. The extension and contraction portion 332 is configured cylindrically by a member having a bellows or a rubber member, for example, and is configured to be capable of extension and contraction in the vertical direction. In the case of this embodiment, the extension and contraction portion 332 is formed cylindrically, but this is not limiting. A lower end portion of the extension and contraction portion 332 is connected to the float 331, and an upper end portion of the extension and contraction portion 332 is connected to the fixing portion 333.

The fixing portion 333 is configured annularly, for example, and is inserted into an inner side of the communication portion 511. An outer side portion of the fixing portion 333 and an inner side portion of the communication portion 511 are in close contact in a state having air tightness and water tightness. The moving member 334 is provided in the housing 321 and on a cylindrical inner side of the extension and contraction portion 332 and is connected to the float 331.

The moving member 334 is fixed to an upper surface of the float 331. In this case, the moving member 334 is for fixing one end portion of the string member 335 to the float 331 and may be an adhesive tape or an adhesive, for example. Moreover, the moving member 334 and the float 331 may be integrally formed.

The string member 335 is constituted by a wire made of metal, for example, and flexibly bendable and non-extendable in the longitudinal direction. The string member 335 is passed through the communication portion 511 from an outside of the housing 321 and is led into the housing 321 and to an inner side of the extension and contraction portion 332. The one end portion of the string member 335 is connected to the moving member 334, and the other end portion of the string member 335 is passed through the tube member 340 and is pulled into the indicator 350 illustrated in FIG. 13. The indicator 350 indicates the height position of the moving member 334 as the remaining amount of the cooling liquid 332 by operating in conjunction with the movement of the moving member 334 through the string member 335.

Figure 15:
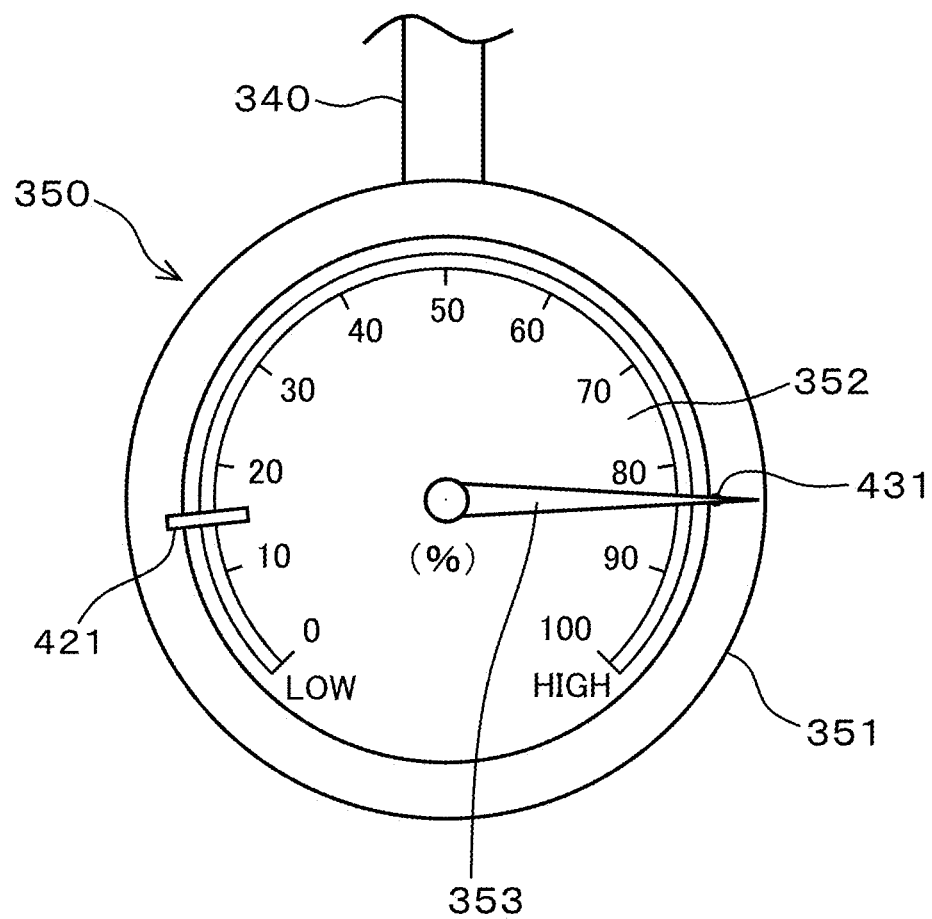
FIG. 15 is a view schematically illustrating an appearance constitution of the indicator of the liquid level indicating device.
Figure 16:
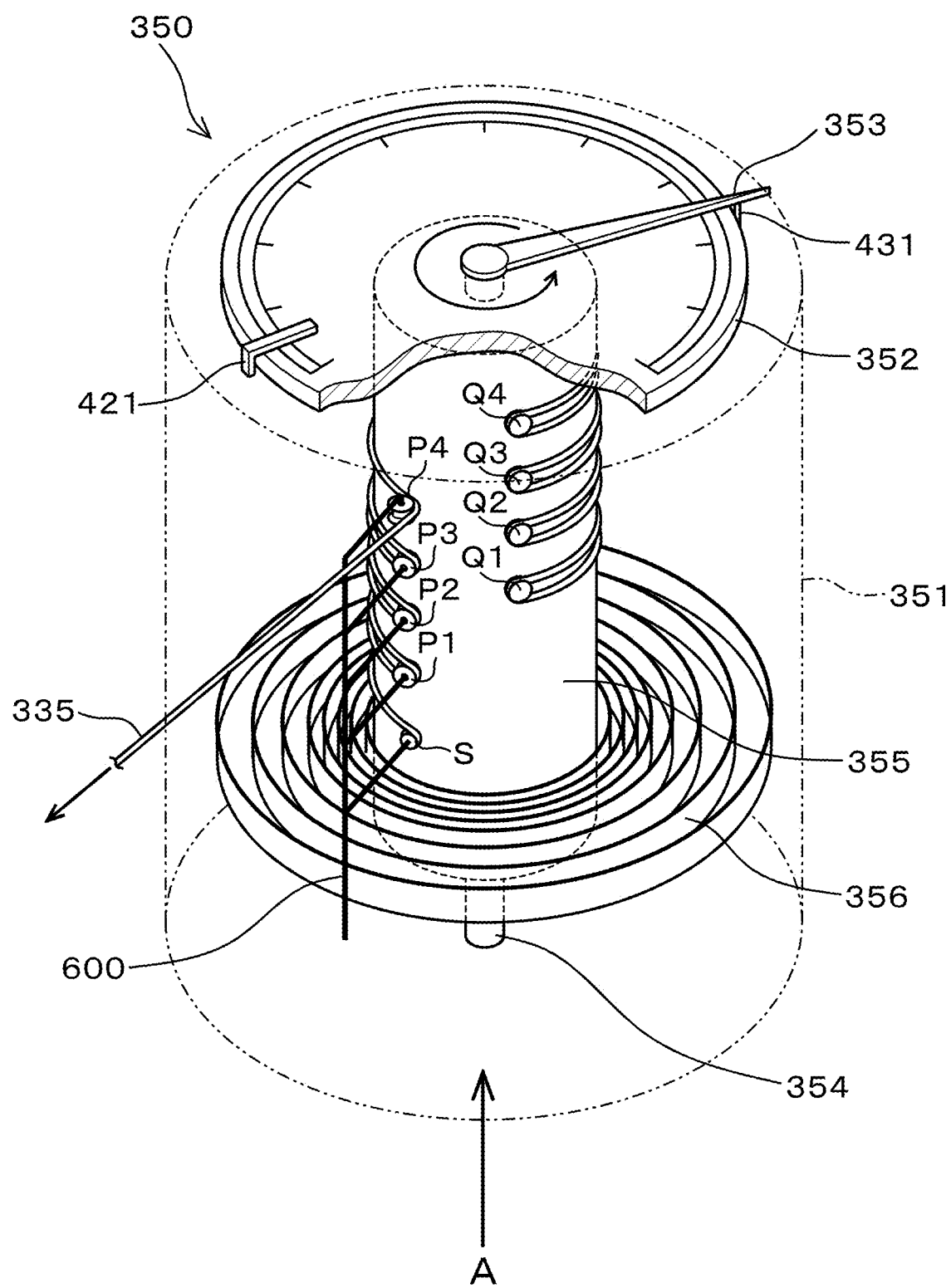
FIG. 16 is a perspective view schematically illustrating an internal constitution of the indicator of the liquid level indicating device.

FIG. 15 is a view schematically illustrating an appearance constitution of the indicator 350 of the liquid level indicating device 330, and FIG. 16 is a perspective view schematically illustrating an internal structure of the indicator 350 of the liquid level indicating device 330. The indicator 350 has, as illustrated in FIGS. 15 and 16, a case 351, a scale plate 352, and an indicating pointer 353. The case 351 is formed having a box shape generally having air tightness and water tightness and constitutes an outer shell of the indicator 350. The other end portion of the tube member 340 is connected to the case 351.

In this case, an inside of the case 351, an inside of the tube member 340, and an inside of the extension and contraction portion 332 communicate with each other and are configured in a sealed space, that is, a space having airtightness and water tightness. The extension and contraction portion 332 includes an effect of suppressing entry of a steam of the cooling liquid 322 or cooling oil, for example, into the sealed space in which the inside of the case 351, the inside of the tube member 340, and the inside of the extension and contraction portion 332 communicate with each other. As a result, an inside of the sealed space in which the inside of the case 351, the inside of the tube member 340, and the inside of the extension and contraction portion 332 communicate with each other can be kept clean and thus, reliability of the liquid-cooled electric appliance 310 can be improved.

The scale plate 352 and the indicating pointer 353 are accommodated in the case 351. In this case, the surface of the case 351 on the worker side is constituted by a transparent member, for example, whereby at least the scale plate 352 and the indicating pointer 353 can be visually recognized from the outside of the case 351.

The scale plate 352 indicates a position of the liquid level 522 of the cooling liquid 322 in the housing 321, that is, the remaining amount. In the case of this embodiment, the scale plate 352 indicates the current liquid level 522 of the cooling liquid 322 present in the housing 321 by a ratio to the maximum liquid level which can be stored in the housing 321. In this case, the term "LOW" described on the scale plate 352 means that the remaining amount of the cooling liquid 322 is small, that is, the liquid level position is low, and the term "HIGH" means that the remaining amount of the cooling liquid 322 is large, that is, the liquid level position is high. Moreover, numerals in the scale plate 352 indicate a ratio when the maximum liquid level is assumed to be 100%.

As illustrated in FIG. 16, the indicating pointer 353 is provided rotatably so that a distal end portion follows the indication of the scale plate 352 and indicates the current liquid level position of the cooling liquid 322, that is, the remaining amount. In the sixth embodiment, clockwise rotation of the indicating pointer 353 means that the liquid level 522 of the cooling liquid 322 has risen, while the counterclockwise rotation of the indicating pointer 353 means that the liquid level 522 of the cooling liquid 322 has lowered.

The indicator 350 has a shaft portion 354, a rotary body 355, the scale plate 352, the indicating pointer 353, and a spiral spring 356, and they are accommodated in the case 351. The shaft portion 354 is a rotating shaft of the rotary body 355 having a columnar shape and the needle-shaped indicating pointer 353. The shaft portion 354 is provided so as to penetrate the rotating shaft at a center part of the rotary body 355, and the rotary body 355 and the indicating pointer 353 are fixed by the shaft portion 354. The scale plate 352 is fixed to the case 351. The shaft portion 354 is provided rotatably with respect to the case 351.

On an end portion of the scale plate 352 in the circumferential direction, a fixed contactor 421 is provided capable of a position change. Moreover, a movable contactor 431 is integrally provided on the indicating pointer 353. The fixed contactor 421 and the movable contactor 431 are configured to be capable of contact by rotational movement of the indicating pointer 353. The fixed contactor 421 and the movable contactor 431 are configured to be capable of being electrically conductive by contact. The fixed contactor 421 and the movable contactor 431 are brought into an electrically conductive state by the contact, whereby they function as a switch. The fixed contactor 421, the movable contactor 431, and the indicating pointer 353 are constituted by a conductive material such as metal, for example. To the fixed contactor 421 and the indicating pointer 353, an electric wire, not shown, is connected, and they are connected to a cooling device of the cooling liquid 322, not shown, for example.

The movable contactor 431 and the fixed contactor 421 function as a switch which is turned on and off by contact and separation. The fixed contactor 421 can be installed at an arbitrary place on the end portion of the scale plate 352. Therefore, the movable contactor 431 and the fixed contactor 421 can be made to function as a switch capable of a switching operation on an arbitrary position of the liquid level 522 of the cooling liquid 322.

When the fixed contactor 421 is arranged at an arbitrary position corresponding to the lowest position of the liquid level 522 on the "LOW" side, for example, the liquid level indicating device 330 can output a signal indicating that the liquid level 522 of the cooling liquid 322 has lowered to the vicinity of the lowest position by turning-on of the switch constituted by the movable contactor 431 and the fixed contactor 421. By using this switch for switch control of a cooler, not shown, equipped in the liquid-cooled electric appliance 310, for example, it can be used for temperature control of the cooling liquid 322.

The rotary body 355 has a substantially cylindrical shape, that is, a drum shape. On an outer peripheral surface of the rotary body 355, a plurality of rotary body side guides Q (hereinafter described as guides Q) is fixed to and arranged on the outer peripheral surface of the rotary body 355. In the sixth embodiment, four guides Q1, Q2, Q3, and Q4 are fixed to the outer peripheral surface of the rotary body 355 in this order.

Moreover, a plurality of case side guides P (hereinafter described as guides P) is fixed to an inner wall of the case 351 by a fixing member 600 so that they are located at positions close to and faced with the rotary body side guides Q. In the sixth embodiment, four guides P1, P2, P3, and P4 are provided, and the guides P1 and Q1, the guides P2 and Q2, the guides P3 and Q3, and the guides P4 and Q4 have corresponding positional relationships.

The guides P and Q are used for leading the string member 335. Moreover, a stopper S is provided on an outer peripheral portion of the rotary body 355 and at a position faced with the guide Q1. The stopper S is used for fixing one of ends of the string member 335.

Figure 17:
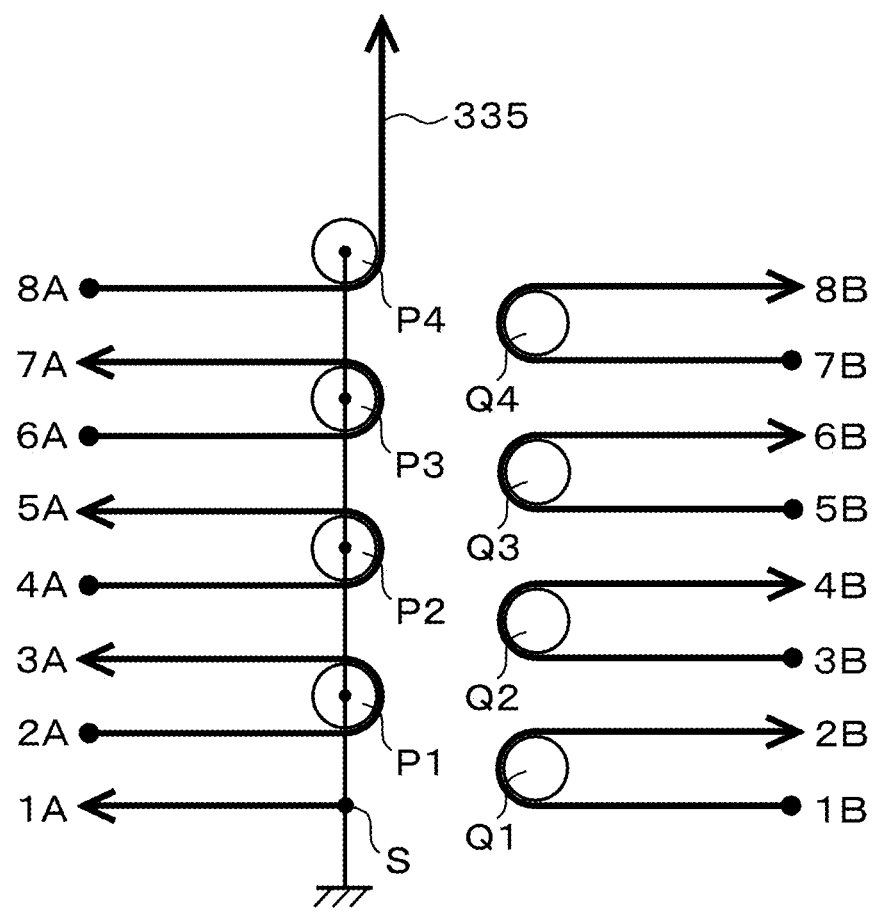
FIG. 17 is a view facing the indicator from an arrow view A direction in FIG. 16 and is a schematic diagram illustrating a state of a string member going around a rotary body while reciprocating by being engaged with a guide.
Figure 18:
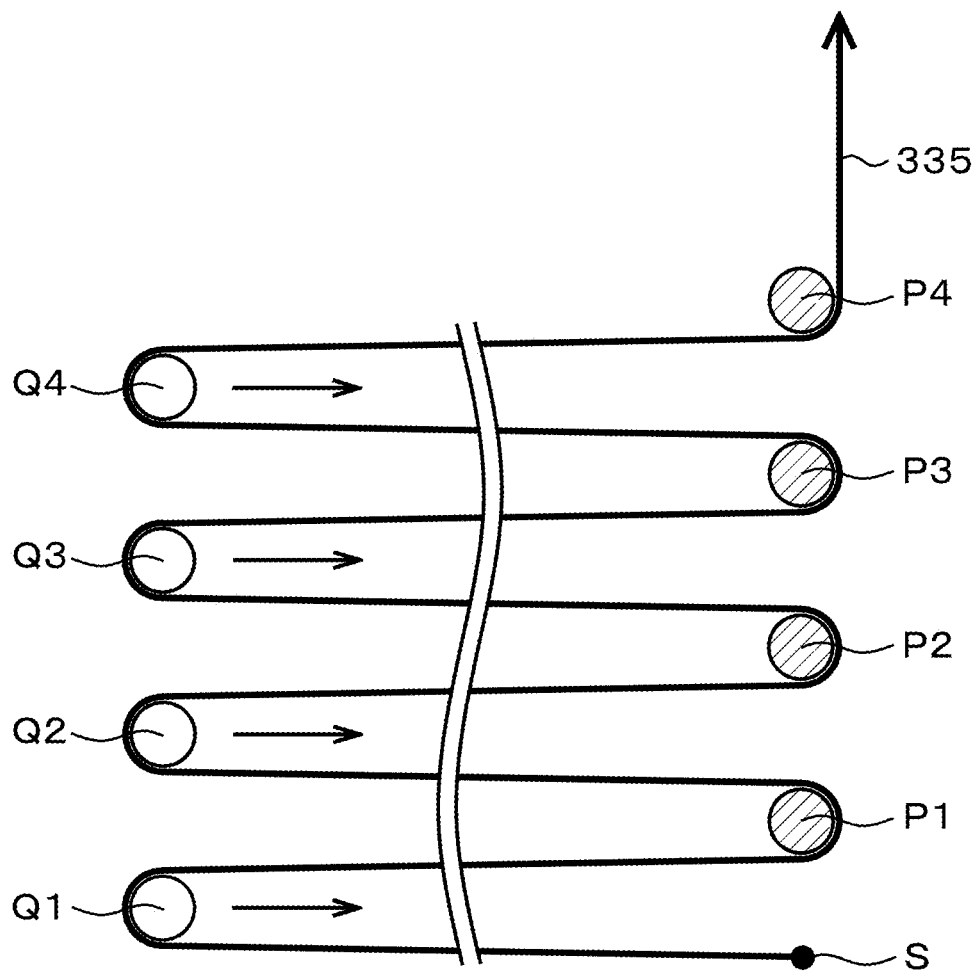
FIG. 18 is an extended view schematically illustrating an operation mechanism of the indicator of the liquid level indicating device.

A constitution in which the string member 335 goes around the outer periphery of the rotary body 355 will be described by referring to FIGS. 16 to 18. FIG. 17 is a view facing the indicator 350 from the arrow view A direction in FIG. 16 and is a schematic diagram illustrating a state of the string member 335 which reciprocally goes around the rotary body 355 by being engaged with the guides P and Q. FIG. 18 is an extended view schematically illustrating an operation mechanism of the indicator 350 of the liquid level indicating device 330.

The string member 335 starts at the stopper S, alternately reciprocates by being guided by the guides P1 to P4 and the guides Q1 to Q4 and goes around a barrel portion of the rotary body 355 and is withdrawn out of the case 351, and in more detail, it goes around as follows. In FIG. 17, marks 1A to 7A and 1B to 8B are given to the string member 335 for understanding of a corresponding relationship of the going-around state.

The string member 335 starts at the stopper S, is directed in a left direction in FIGS. 16 and 17, that is, the clockwise direction (a first direction) (1A), goes around the barrel portion of the rotary body 355 in the clockwise direction and then, is led from the right side (1B) in the figure to a guide Q1 direction and goes back to an opposite direction at the guide Q1, and is directed to a right direction in the figure, that is, the counterclockwise direction (a second direction) (2B). Subsequently, it goes around the barrel portion of the rotary body 355 in the counterclockwise direction and then, is led from a left side (2A) in the figure to the guide P1 direction and goes back to the opposite direction at the guide P1, and is directed to the left direction in the figure, that is, the clockwise direction (3A). This is repeated thereafter.

As described above, the string member 335 goes around the barrel portion of the rotary body 355 while reciprocating by being alternately engaged with the guide P and the guide Q as the stopper S, the guides P1 to P4, the guides Q1 to Q4 as
1A→1B→2B→2A→3A→3B→4B→4A→5A→5B→6B→6A→7A→7B→8B→8A
and is led from the guide P4 to the outside of the case 351. The string member 335 led to the outside of the case 351 is connected to the float 331 through the tube member 340. The string member 335 is movable while sliding with the guide P and the guide Q and converts the variation amount D to the rotary motion of the rotary body 355 of the indicator 350.

FIG. 18 illustrates a state where the string member 335, the stopper S, the guides P1 to P4, and the guides Q1 to A4 are schematically extended on a plane. The guide P is fixed to the case 351, and the stopper S and the guide Q are fixed to the rotary body 355. By withdrawing the string member 335 to a front direction in FIG. 16 and an upper direction in FIG. 17, the string member 335 pulls the guides Q1 to Q4 to the right direction in FIG. 18. In accordance with the withdrawn amount of the string member 335, they move to the right side direction in FIG. 18 (indicated by an arrow in the figure) in the order of the guide Q4→Q3→Q2→Q1. That is, in FIG. 16, the rotary body 355 rotates in the counterclockwise direction. The indicator 350 transmits the height position of the moving member 334 to the indicating pointer 353 through the rotation of the rotary body 355 by movement of the string member 335 in conjunction with the movement of the moving member 334 and indicates it as the remaining amount of the cooling liquid 322.

This mechanism constituted by the string member 335, the stopper S, the guides P1 to P4, and the guides Q1 to A4 is a constitution in which an operation principle of a compound pulley is arranged around the barrel of the rotary body 355. That is, when the state of the string member 335 in which, with one end fixed to the guides P1 to P4, the guides Q1 to Q4, and the stopper S, it goes around the rotary body 355 while reciprocating by being alternately engaged with the guide P and the guide Q is extended, the compound pulley mechanism is realized as illustrated in FIG. 18. Therefore, a length of a circumference of the rotary body 355 for a rotating angle rotated in conjunction with that with respect to the withdrawn length of the string member 335 is a half of the case where such mechanism is not used. The withdrawn length of the string member 335 is a length of the variation amount D of the liquid level 522 in this case.

Here, assuming a case where the variation amount D from the assumed uppermost surface to the lowermost surface of the liquid level 522 is 500 mm and a swing angle of the indicating pointer 353 is 270 degrees, for example, when the liquid level 522 lowers only by the variation amount D, the string member 335 is withdrawn by 500 mm. In this case, a size of the rotary body 355 is set so that the indicating pointer 353 is rotated by 270 degrees which is the swing angle.

Here, if the aforementioned mechanism is not used but the string member 335 is made to simply go around the rotary body 355, a diameter of the rotary body 355 is 500 mm× (4/3)/π≈212, and a diameter of approximately 200 mm is needed. On the other hand, if the mechanism in which the string member 335 is made to go around by going back at the guides P and Q is used as described above, the diameter of the rotary body 355 is 212 mm/2=106, and a diameter of approximately 100 mm is needed. Therefore, the size of the rotary body 355 can be made smaller to an approximately half of the diameter. As a result, the size of the indicator 350 can be configured to be smaller.

Figure 19:
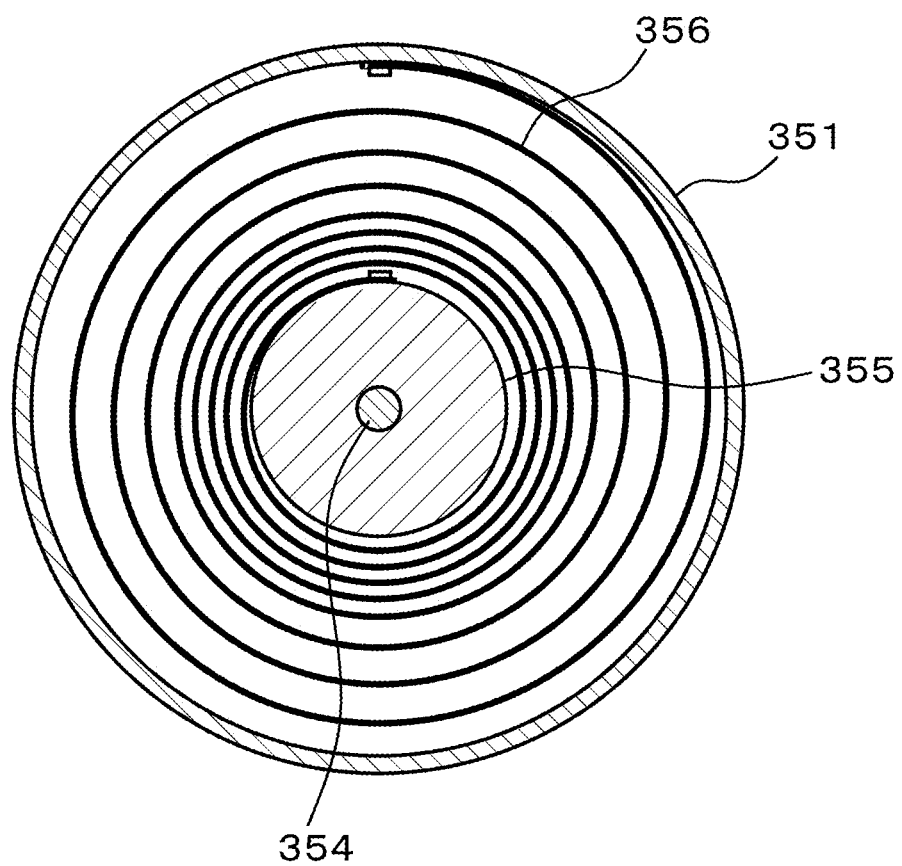
FIG. 19 is a cross sectional view schematically illustrating an urging mechanism by a spiral spring.

Moreover, as illustrated in FIGS. 16 and 19, the indicator 350 includes a spiral spring (coil spring) 356 having one end fixed to the inner wall of the case 351 and the other end fixed to the barrel portion of the rotary body 355. The rotary body 355 is arranged at a center part of the spiral spring 356, and an outer peripheral portion of the spiral spring 356 is arranged so as to face the case 351.

The spiral spring 356 is configured so as to urge in the direction to take up the string member 335 around the rotary body 355 or to urge the rotation of the rotary body 355 in the clockwise direction in this embodiment. The urging force of the spiral spring 356, that is, the elastic force is set to such strength that the taking-up and the withdrawal of the string member 335 can be performed with the vertical movement of the float 331 and the moving member 334. That is, the urging force of the spiral spring 356 is set to such strength that, when the string member 335 sags due to the rise of the moving member 334, the rotary body 355 can be rotated toward the direction of taking-up the string member 335 or to the clockwise side in this case and when the string member 335 is pulled by the lowering of the moving member 334, the rotary body 355 can be rotated toward a direction where the string member 335 is withdrawn or on the counterclockwise side in this case. That is, the urging force made to act on the rotary body 355 by the spiral spring 356 is set smaller than a force of gravity acting on the float 331 and the moving member 334.

According to this constitution, when the cooling liquid 322 in the housing 321 increases, that is, when the liquid level 522 position rises, and the float 331 and the moving member 334 rise, substantially at the same time when the string member 335 sags, the rotary body 355 rotates in the clockwise direction and takes up the string member 335. On the other hand, when the cooling liquid 322 in the housing 321 decreases, that is, when the liquid level 522 position lowers, and the float 331 and the moving member 334 lower, the string member 335 is pulled against the urging force of the spiral spring 356. Then, the rotary body 355 rotates in the puling direction of the string member 335, that is, the counterclockwise direction, whereby the string member 335 is withdrawn from the case 351.

Then, when the rotary body 355 rotates as described above, the rotation of the rotary body 355 is transmitted to the indicating pointer 353 through the shaft portion 354. Then, the rotation of the rotary body 355 is stopped at a position where the urging force of the spiral spring 356 is balanced with the tensile force of the string member 335, whereby the rotation of the shaft portion 354 and the indicating pointer 353 is also stopped. The position indicated by the indicating pointer 353 at that time is the liquid level 522 position of the cooling liquid 322 in the housing 321, that is, the remaining amount of the cooling liquid 322. Therefore, the user can check the position of the liquid level 522, that is, the remaining amount of the cooling liquid 322 by visually recognizing the indicator 350 provided at a position easy to be seen and by checking the position indicated by the indicating pointer 353 without moving the field of vision to the height of the liquid level 522.

In this case, the user can adjust the swing angle of the indicating pointer 353 by changing the diameter of the rotary body 355. For example, if the variation amount D is small, in order to improve visibility to the variation amount D by increasing the swing angle of the indicating pointer 353 so that visibility to the variation amount D is to be improved, the diameter of the rotary body 355 only needs to be made smaller, and if the variation amount D is too large, the swing angle of the indicating pointer 353 can be adjusted to be smaller by increasing the diameter of the rotary body 355.

According to the liquid level indicating device 330 according to the sixth embodiment, the following effects are exerted.

The liquid level indicating device 330 includes the indicator 350, the tube member 340, the float 331 and the moving member 334, and the string member 335 passed through the tube member 340 and connecting the moving member 334 and the indicator 350. The indicator 350 includes the case 351, the rotary body 355, the indicating pointer 353 fixed to the rotary body 355, the stopper S for fixing the plurality of guides P fixed to the case 351 side, the plurality of guides Q fixed to the rotary body 355 side, and the string member 335 to the rotary body 355, and the string member 335 going around the outer periphery of the rotary body 355. The plurality of guides P and guides Q are arranged at positions corresponding to each other. The string member 335 goes around the rotary body 355 while reciprocating by being alternately engaged with the plurality of guides P and guides Q. The positional relationships between the string member 335 and the stopper S, the guide P, and the guide Q is arranged so as to constitute the compound pulley.

As a result, the indicator 350 can be installed at the position which can be visibly recognized by the worker easily without being limited by the liquid level 522 position of the cooling liquid 322 and thus, visibility of the indicator 350 indicating the position of the liquid level 522 is improved.

Moreover, with respect to the withdrawn length of the string member 335, that is, the variation amount D of the liquid level 522 of the cooling liquid 322, the length of the circumference of the rotary body 355 rotated in conjunction with that is made shorter to a half. Thus, the size of the rotary body 355, that is, the diameter of the cylindrical rotary body 355 can be made smaller to an approximately half. Therefore, since the indicator 350 can be configured to be smaller, a demand for collecting various instruments in a terminal box in a compact manner can be satisfied, for example.

Moreover, the switch can be constituted by contact and separation between the movable contactor 431 provided on the indicating pointer 353 and the fixed contactor 421 provided on the scale plate 352. As a result, the on and off control of the switch can be made possible in accordance with the position of the liquid level 522. For example, by controlling a cooler, not shown, in accordance with the position of the liquid level 522, temperature control of the cooling liquid 322 can be performed.

Moreover, the indicator 350 includes the spiral spring (coil spring) 56 having the one end fixed to the case 351 and the other end to the barrel portion of the rotary body 355 and is configured so as to urge toward the direction of taking up the string member 335 around the rotary body 355. As a result, since the string member 335 is urged toward the direction where it is taken up by the rotary body 355, that is, to the rising direction of the float 331 at all times, the string member 335 does not sag any more, and the position of the liquid level 522 can be accurately indicated. Moreover, when the liquid level 522 rises, the string member 335 can be automatically taken up by the rotary body 355.

Seventh Embodiment

Figure 20:
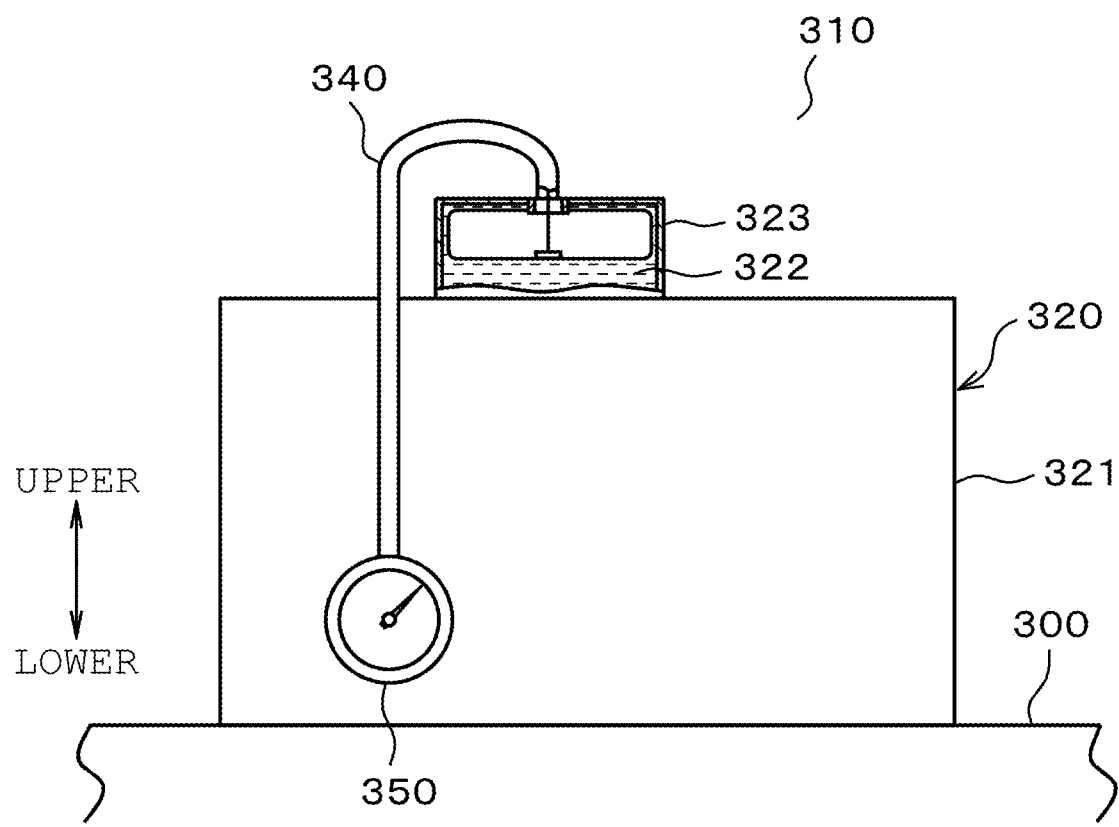
FIG. 20 is a view illustrating a schematic constitution of the liquid-cooled electric appliance according to a seventh embodiment.
Figure 21:
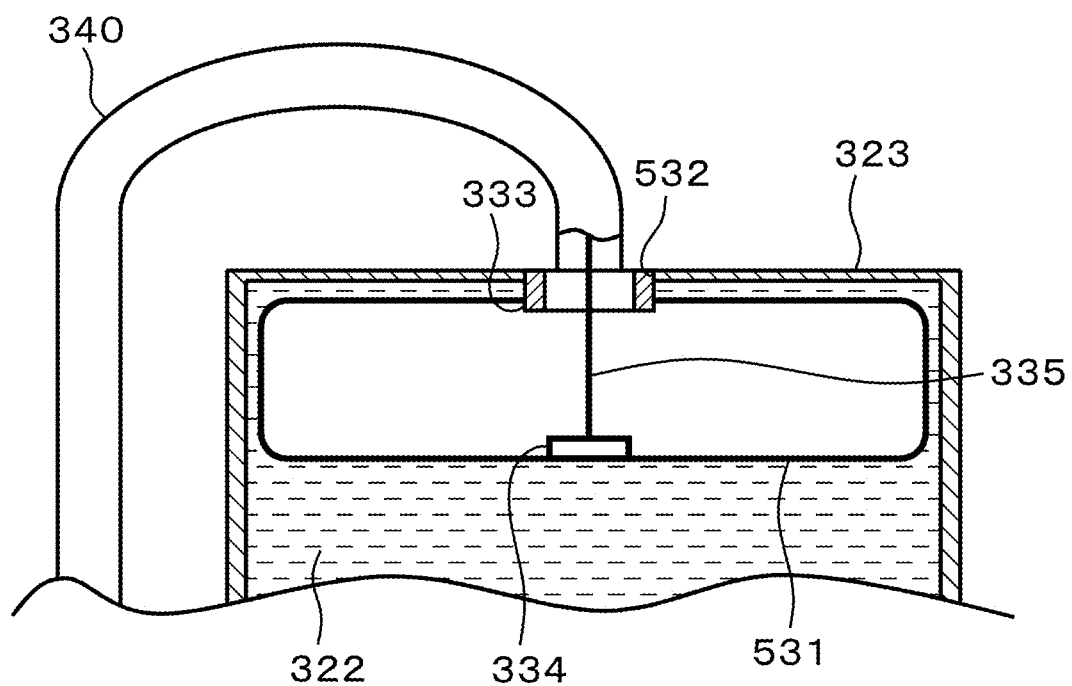
FIG. 21 is a view schematically illustrating constituent elements of the liquid level indicating device arranged in the conservator.

Next, a seventh embodiment will be described by referring to FIGS. 20 and 21. FIG. 20 is a view illustrating a schematic constitution of the liquid-cooled electric appliance 310 according to the seventh embodiment, and FIG. 21 is a view schematically illustrating constituent elements of the liquid level indicating device 330 arranged in the conservator 323.

The seventh embodiment is an example in which the indicator 350 in the sixth embodiment is applied to the conservator. In the seventh embodiment, the liquid-cooled electric appliance 310 further includes the conservator 323. In this case, the indicator 350 indicates the remaining amount of the cooling liquid 322 in the conservator 323. The conservator 323 has a known constitution, and as illustrated in FIG. 21, it has an air bag 531 which absorbs the variation in the cooling liquid 322 therein. Moreover, the conservator 323 has a communication portion 532 which causes the inside and the outside to communicate with each other. The communication portion 532 of the conservator 323 has a function similar to the communication portion 511 of the housing 321 in the aforementioned embodiment. That is, the fixing portion 333 is passed through the communication portion 532 and is fixed.

The moving member 334 of the indicator 350 is provided on an inner surface on a lower side in the air bag 531. The moving member 334 has the one end portion of the string member 335 fixed to the lower-side inner surface of the air bag 531. The moving member 334 may be an adhesive tape or an adhesive, for example. Moreover, the moving member 334 and the air bag 531 may be formed integrally. The inside of the case 351, the inside of the tube member 340, and the inside of the air bag 531 communicate with each other and are configured in a sealed space having air tightness and water tightness.

According to this constitution, too, an effect similar to that of the sixth embodiment is obtained. That is, when the remaining amount of the cooling liquid 322 in the conservator 323 changes and the air bag 531 is expanded or contracted, the moving member 334 is moved in the vertical direction by the expansion or contraction of the air bag 531. And the movement of the moving member 334 in the vertical direction is transmitted to the indicator 350 through the string member 335, and the indicating pointer 353 is rotated. As a result, the user can check the remaining amount of the cooling liquid 322 in the conservator 323 easily similarly to the sixth embodiment by reading the contents indicated by the indicating pointer 353 of the indicator 350.

Eighth Embodiment

Figure 22:
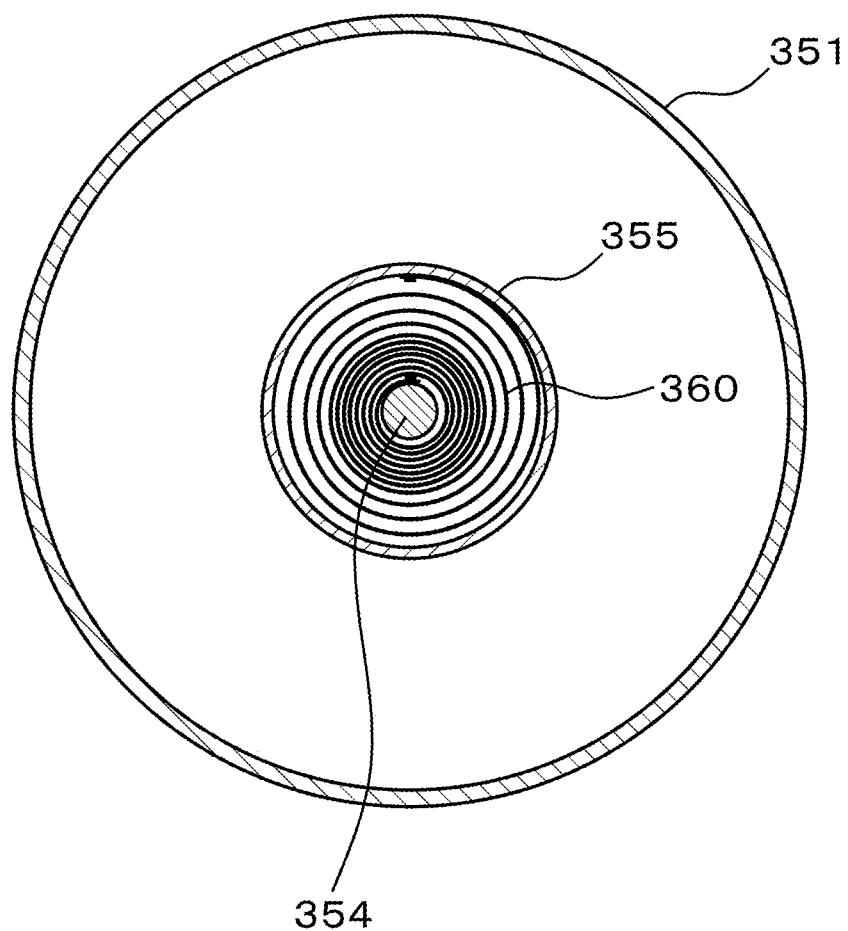
FIG. 22 is a cross sectional view schematically illustrating the urging mechanism of the spiral spring in an eighth embodiment.

Next, an eighth embodiment will be described by referring to FIG. 22. FIG. 22 is a cross sectional view schematically illustrating an urging mechanism by a spiral spring 360 of the indicator 350 of the liquid-cooled electric appliance 310 according to the eighth embodiment. As illustrated in FIG. 22, in the eighth embodiment, the spiral spring 360 is arranged in the rotary body 355. One end of the spiral spring 360 is fixed to the outer peripheral portion of the shaft portion 354, and the other end of the spiral spring 360 is fixed to the inner wall of the rotary body 355. The shaft portion 354 is fixed to the case 351. The indicating pointer 353 and the rotary body 355 are in a mutually fixed state and are configured rotatably with respect to the shaft portion 354 through the spiral spring 360. The spiral spring 360 is configured to urge the rotary body 355 toward the direction where the rotary body 355 takes up the string member 335. As a result, an effect similar to that of the sixth embodiment is obtained. Moreover, since the spiral spring 356 is not arranged on the outer periphery of the rotary body 355, the size of the indicator 350 can be further reduced.

As described above, some embodiments of the present invention have been described, but these embodiments are presented as examples and are not intended to limit a scope of the invention. These novel embodiments can be put into practice in the other various forms and are capable of various types of omission, replacement and changes within a range not departing from the gist of the invention. These embodiments and their variations are included in the scope and the gist of the invention and are also included in the range of the invention described in the scope of claims and the equivalents thereof.

By constituting such that the position of the guide P or the guide Q is variable on the outer periphery of the rotary body 355, the position of the guide P or the guide Q is adjusted, and the length of the string member 335 taken up by the rotary body 355 can be changed. As a result, the length of the string member 335 made to go around the rotary body 355 can be adjusted to the optimum in accordance with the variation amount D of the liquid level 522. Moreover, the length of the string member 335 taken up by the rotary body 355 may be adjusted by adjusting the numbers of the guides P and the guides Q.

The invention claimed is:

1. A liquid level indicating device comprising:
   a moving member which is arranged in a liquid tank storing a cooling liquid and configured to move in a vertical direction in conjunction with variation in a liquid level of the cooling liquid;
   a string member comprising one end portion connected to the moving member, the string member being configured to be bendable and non-extendable in a longitudinal direction;
   an indicator which is connected to an other end portion of the string member and configured to indicate a height position of the moving member as a remaining amount of the cooling liquid by operating in conjunction with a movement of the moving member through the string member;
   a tube member configured to be bendable and non-extendable in the longitudinal direction, the tube member configured to connect the liquid tank and the indicator to each other with the string member passed therethrough, wherein:
   the indicator comprises:
   a case;
   a rotary body provided rotatably in the case, and comprising the other end portion of the string member connected to an outer peripheral surface and configured to take up the string member;
   a shaft portion provided rotatably in conjunction with rotation of the rotary body;
   an indicating pointer provided on the shaft portion and configured to indicate a rotation amount of the shaft portion as the remaining amount of the cooling liquid; and
   an urging member configured to urge the rotary body to a taking-up direction of the string member,
   wherein the indicator is configured to change the rotation amount of the shaft portion with respect to a taking-up amount of the string member by the rotary body.

2. The liquid level indicating device according to claim 1, wherein:
   the rotary body is formed by winding a plate member in a cylindrical shape and is configured to change an outer diameter by changing an overlapping amount of both end portions of the plate member.

3. The liquid level indicating device according to claim 1, further comprising:
   a float configured to float on the cooling liquid;
   an extension and contraction portion configured to extend and contract with movement of the float in the vertical direction, wherein:
   the moving member is provided inside the extension and contraction portion; and
   an inside of the indicator, an inside of the tube member, and an inside of the extension and contraction portion are configured to communicate with each other and are configured in a sealed space.

4. The liquid level indicating device according to claim 1, further comprising:
   a float configured to float on the cooling liquid; and
   a cylindrical member configured cylindrically and arranged in the liquid tank in a state where the moving member is accommodated, wherein
   an inside of the case, an inside of the tube member, and an inside of the cylindrical member communicate with each other and are configured in a sealed space; and
   the float and the moving member are configured to be integrally movable by being mutually attracted by a magnetic force.

5. The liquid level indicating device according to claim 1, wherein
   the moving member is provided inside an air bag of a conservator; and
   an inside of the case, an inside of the tube member, and an inside of the air bag communicate with each other and are configured in a sealed space.

6. A liquid-cooled electric appliance comprising the liquid level indicating device according to claim 1.

7. A liquid level indicating device comprising:
   a moving member which is arranged in a liquid tank storing a cooling liquid and configured to move in a vertical direction in conjunction with variation in a liquid level of the cooling liquid;
   an indicator configured to indicate a remaining amount of the cooling liquid;
   a string member comprising one end connected to the moving member, wherein the indicator includes a scale plate, an indicating pointer, a cylindrical rotary body a barrel portion of which the string member goes around, a shaft portion configured to connect the indicating pointer and the rotary body in a rotating shaft, and a case accommodating these components;
   a plurality of rotary body side guides is provided on an outer periphery of the rotary body, and a plurality of case side guides and a stopper are provided in the case so as to be close to and faced with the rotation side guide; and
   an other end of the string member is fixed to the stopper, the string member is configured to go around the rotary body while reciprocating by alternately being engaged with the rotary body side guide and the case side guide and then, the string member is withdrawn to an outside of the case, and is configured to transmit a height position of the moving member to the indicating pointer through rotation of the rotary body by operating in conjunction with movement of the moving member connected to the one end.

8. The liquid level indicating device according to claim 7, wherein:
   the string member, the rotary body side guide, the stopper, and the case side guide are deployed as a compound pulley mechanism by extending a state where the string member is fixed to the stopper and is made to go around the rotary body while reciprocating by being alternately engaged with the rotary body side guide and the case side guide.

9. The liquid level indicating device according to claim 7, further comprising:
a spiral spring, wherein:
the rotary body is arranged at a center portion of the spiral spring and is fixed to one end of the spiral spring, the other end of the spiral spring is fixed to an inner wall of the case, and the spiral spring is provided so as to urge toward a direction where the rotary body takes up the string member.

10. The liquid level indicating device according to claim 7, further comprising:
a spiral spring, wherein:
the spiral spring is provided inside the rotary body, the shaft portion is arranged at a center portion of the spiral spring and is fixed to one end of the spiral spring, the other end of the spiral spring is fixed to an inner wall of the rotary body, and the spiral spring is provided so as to urge toward the direction where the rotary body takes up the string member.

11. The liquid level indicating device according to claim 7, further comprising:
a fixed contactor provided on the scale plate, capable of changing a position; and
a movable contactor provided integrally on the indicating pointer and capable of contact with the fixed contactor, wherein:
when the fixed contactor is in contact with the movable contactor, a space between the fixed contactor and the movable contactor is brought into an electrically conductive state, and the fixed contactor and a movable contactor function as a switch.

12. The liquid level indicating device according to claim 7, further comprising:
a float configured to float on the cooling liquid;
an extension and contraction portion which is configured to extend and contract with movement of the float in the vertical direction;
a tube member which connects the liquid tank and the indicator to each other with the string member passed therethrough, wherein:
the moving member is provided inside the extension and contraction portion; and
an inside of the case, an inside of the tube member, and an inside of the extension and contraction portion communicate with each other and are configured in a sealed space.

13. A liquid-cooled electric appliance comprising the liquid level indicating device according to claim 7.

14. A liquid level indicating device comprising:
a moving member which is arranged in a liquid tank storing a cooling liquid and configured to move in a vertical direction in conjunction with variation in a liquid level of the cooling liquid;
a string member comprising one end portion connected to the moving member, the string member being configured to be bendable and non-extendable in a longitudinal direction;
an indicator which is connected to an other end portion of the string member and configured to indicate a height position of the moving member as a remaining amount of the cooling liquid by operating in conjunction with a movement of the moving member through the string member;
a tube member configured to be bendable and non-extendable in the longitudinal direction, the tube member configured to connect the liquid tank and the indicator to each other with the string member passed therethrough,
a float configured to float on the cooling liquid;
an extension and contraction portion which extends and contracts with movement of the float in the vertical direction, wherein:
the moving member is provided inside the extension and contraction portion; and
an inside of the indicator, an inside of the tube member, and an inside of the extension and contraction portion are configured to communicate with each other and are configured in a sealed space.

15. The liquid level indicating device according to claim 14, wherein the indicator comprises:
a case;
a rotary body provided rotatably in the case and comprising the other end portion of the string member connected to an outer peripheral surface and capable of taking up the string member;
a shaft portion provided rotatably in conjunction with rotation of the rotary body;
an indicating pointer provided on the shaft portion, the indicating pointer indicating a rotation amount of the shaft portion as the remaining amount of the cooling liquid; and
an urging member which configured to urge the rotary body to taking-up direction of the string member.

16. The liquid level indicating device according to claim 14, wherein the indicator comprises:
a case;
a mover provided in the case and capable of linear movement toward a direction where the string member is extended;
an indicating pointer provided on the mover, the indicating pointer configured to indicate a moving amount of the mover as the remaining amount of the cooling liquid; and
an urging member configured to urge the mover toward a direction where the string member is pulled into the case.

* * * * *